United States Patent
Fujita et al.

(10) Patent No.: US 11,274,040 B2
(45) Date of Patent: Mar. 15, 2022

(54) METHOD FOR GENERATING CHLORINE DIOXIDE GAS, KIT FOR GENERATING CHLORINE DIOXIDE GAS, AND GEL COMPOSITION

(71) Applicant: AMATERA, INC., Aichi (JP)

(72) Inventors: Hiromasa Fujita, Aichi (JP); Tetsuhiro Fujita, Aichi (JP); Masashi Fujita, Aichi (JP); Hiroshi Takatomi, Aichi (JP)

(73) Assignee: AMATERA, INC., Aichi (JP)

( * ) Notice: Subject to any disclaimer, the term of this patent is extended or adjusted under 35 U.S.C. 154(b) by 0 days.

(21) Appl. No.: 16/465,672

(22) PCT Filed: Apr. 25, 2018

(86) PCT No.: PCT/JP2018/016755
§ 371 (c)(1),
(2) Date: May 31, 2019

(87) PCT Pub. No.: WO2019/064664
PCT Pub. Date: Apr. 4, 2019

(65) Prior Publication Data
US 2019/0300367 A1    Oct. 3, 2019

(30) Foreign Application Priority Data

Sep. 29, 2017 (JP) .............................. JP2017-190121

(51) Int. Cl.
*C01B 11/02* (2006.01)
*B01J 13/00* (2006.01)

(52) U.S. Cl.
CPC ......... *C01B 11/024* (2013.01); *B01J 13/0056* (2013.01); *C01B 11/02* (2013.01)

(58) Field of Classification Search
CPC .......................... C01B 11/024; B01J 13/0056
See application file for complete search history.

(56) References Cited

U.S. PATENT DOCUMENTS

| 3,278,447 A | * | 10/1966 | McNicholas | ......... C01B 11/022 252/186.21 |
| 6,077,495 A | * | 6/2000 | Speronello | ............. A01N 59/00 423/477 |

(Continued)

FOREIGN PATENT DOCUMENTS

| CN | 101177244 A | 5/2008 |
| CN | 101194627 A | 6/2008 |

(Continued)

OTHER PUBLICATIONS

Machine translation for description section of CN 1011946272006 (Year: 2006).*

(Continued)

*Primary Examiner* — Ngoc-Yen Nguyen
(74) *Attorney, Agent, or Firm* — Studebaker & Brackett PC

(57) ABSTRACT

In a method for generating a chlorine dioxide gas, the chlorine dioxide gas is continuously generated from a gel composition obtained by adding a gelling activator containing a gas generating agent, a gas generation controlling agent containing a carbonate and hydrogen peroxide, a gas generation adjusting agent, and a water-absorbent resin to a chlorite aqueous solution. This provides a method for generating a chlorine dioxide gas, a kit for generating a chlorine dioxide gas, and a gel composition which suppress the initial rapid generation of the chlorine dioxide gas and stably hold the generation of the chlorine dioxide gas for an extremely long time.

11 Claims, 6 Drawing Sheets

(56) References Cited

U.S. PATENT DOCUMENTS

| | | | | |
|---|---|---|---|---|
| 6,238,643 | B1* | 5/2001 | Thangaraj | A61L 2/18 252/187.21 |
| 2009/0078911 | A1 | 3/2009 | Shibata et al. | |
| 2015/0284249 | A1 | 10/2015 | Fujita et al. | |

FOREIGN PATENT DOCUMENTS

| | | |
|---|---|---|
| CN | 101384507 A | 3/2009 |
| CN | 102847181 B | 5/2014 |
| CN | 103906704 A | 7/2014 |
| JP | H09-202706 A | 8/1997 |
| JP | H11-278808 A | 10/1999 |
| JP | 2003-012424 A | 1/2003 |
| JP | 2005-029430 A | 2/2005 |
| JP | 2011-132048 A | 7/2011 |
| JP | 2012-046375 A | 3/2012 |
| JP | 2016-088797 A | 5/2016 |
| JP | 2017-110091 A | 6/2017 |
| WO | 2007/078838 A2 | 7/2007 |

OTHER PUBLICATIONS

International Search Report issued in PCT/JP2018/016755; dated Jul. 24, 2018.

An Office Action; "Notice of Reasons for Refusal," dated by the Japanese Patent Office on Jul. 17, 2018, which corresponds to Japanese Patent Application No. 2017-190121.

An Office Action; "Decision to Grant a Patent," dated by the Japanese Patent Office on Jan. 15, 2019, which corresponds to Japanese Patent Application No. 2017-190121.

An Office Action dated by the State Intellectual Property Office of the People's Republic of China on Sep. 17, 2019, which corresponds to Chinese Patent Application No. 201880004604.X and is related to U.S. Appl. No. 16/465,672.

The extended European search report dated by the European Patent Office on Dec. 12, 2019, which corresponds to European Patent Application No. 18863399.4-1106 and is related to U.S. Appl. No. 16/465,672.

* cited by examiner

METHOD FOR GENERATING CHLORINE DIOXIDE GAS, KIT FOR GENERATING CHLORINE DIOXIDE GAS, AND GEL COMPOSITION

TECHNICAL FIELD

The present invention relates to a method for generating a dilute chlorine dioxide gas used for environmental purification, sterilization or disinfection of bacteria or virus and the like, deodorization, antifungal, and antisepsis and the like of indoor (inside and outside room), outdoor or food and the like, a kit for generating a chlorine dioxide gas, and a gel composition.

BACKGROUND ART

Chlorine dioxide has strong oxidizing power, and is widely used as a sterilization agent, a fungicide, a deodorant, a mildew-proofing agent, a preservative agent, or a bleaching agent and the like in fields such as environmental purification, sterilization or disinfection of bacteria or virus and the like, and deodorization, antifungal, and antisepsis and the like of indoor, outdoor or food and the like in house Or hospital and the like.

For the above applications, for example, Japanese Patent Laying-Open No. 11-278808 (PTL 1) discloses a pure chlorine dioxide solution having a dissolved chlorine dioxide gas, a chlorite and a pH adjuster as constituents, a gel composition containing the pure chlorine dioxide solution and a superabsorbent polymer, and continuous generation of a chlorine dioxide gas using the pure chlorine dioxide solution or the gel composition.

Japanese Patent Laying-Open No. 2003-12424 (PTL 2) discloses a chlorine dioxide composition containing a calcined aggregate, water, and dissolved chlorine dioxide in order to control the amount of a chlorine dioxide gas released, and a chlorine dioxide composition containing the chlorine dioxide composition and a gelling activator.

Japanese Patent Laying-Open No. 2005-29430 (PTL 3) discloses a method for generating a chlorine dioxide gas to further increase the generation holding time of the chlorine dioxide gas. The method includes adding organic acid or inorganic acid, a powdery gas generation adjusting agent such as sepiolite, or the gas generation adjusting agent and a water-absorbent resin to a chlorite aqueous solution to gel the chlorite aqueous solution, thereby continuously generating the chlorine dioxide gas.

CITATION LIST

Patent Literature

PTL 1: Japanese Patent Laying-Open No. 11-278808
PTL 2: Japanese Patent Laying-Open No. 2003-12424
PTL 3: Japanese Patent Laying-Open No. 2005-29430

SUMMARY OF INVENTION

Technical Problem

The gel composition disclosed in Japanese Patent Laying-Open No. 11-278808 (PTL 1) can continuously generate the chlorine dioxide gas for a long time, but only the addition of the superabsorbent polymer makes it difficult to adjust the transpiration rate of the chlorine dioxide gas. For example, the transpiration rate is disadvantageously increased due to an increase in a temperature.

The gel compositions disclosed in Japanese Patent Laying-Open No. 2003-12424 (PTL 2) and Japanese Patent Laying-Open No. 2005-29430 (PTL 3) can further increase the generation holding time of the chlorine dioxide gas as compared with the gel composition disclosed in Japanese Patent Application Laid-Open No. 11-278808 (PTL 1), but the amount of the chlorine dioxide gas generated is initially large, and decreases with the lapse of time, so that, from the viewpoints of environmental purification, sterilization or disinfection of bacteria or virus and the like, and deodorization, antifungal, and antisepsis and the like of indoor, outdoor or food and the like in house or hospital and the like, the generation holding time of the chlorine dioxide gas is required to be further increased.

It is an object of the present invention to provide a method for generating a chlorine dioxide gas, a kit for generating a chlorine dioxide gas, and a gel composition which suppress the initial rapid generation of the chlorine dioxide gas and stably hold the generation of the chlorine dioxide gas for an extremely long time.

Solution to Problem

An aspect of the present invention is a method for generating a chlorine dioxide gas, the method including continuously generating the chlorine dioxide gas from a gel composition obtained by adding a gelling, activator containing a gas generating agent, a gas generation controlling agent containing a carbonate and hydrogen peroxide, a gas generation adjusting agent, and a water-absorbent resin to a chlorite aqueous solution.

In the method according to the aspect of the present invention, the gel composition may have a flat surface from which the chlorine dioxide gas is generated. The chlorite aqueous solution may be enclosed in an airtight container before the gelling activator is added. The gelling activator may be enclosed in an airtight container before being added to the chlorite aqueous solution.

Another aspect of the present invention is a kit for generating a chlorine dioxide gas, the kit including: an agent (A) containing a chlorite aqueous solution; and an agent (B) containing a gelling, activator containing a gas generating agent, a gas generation controlling agent containing a carbonate and hydrogen peroxide, a gas generation adjusting agent, and a water-absorbent resin, wherein the chlorine dioxide gas is continuously generated by adding the agent (B) to the agent (A).

Still another aspect of the present invention is a gel composition including: a chlorite aqueous solution; and a gelling activator containing a gas generating agent, a gas generation controlling agent containing a carbonate and hydrogen peroxide, a gas generation adjusting agent, and a water-absorbent resin, wherein a chlorine dioxide gas is continuously generated.

In the gel composition according to the aspect of the present invention, the gel composition may have a flat surface from which the chlorine dioxide gas is generated.

Advantageous Effect of Invention

According to the present invention, there is provided a method for generating a chlorine dioxide gas, a kit for generating a chlorine dioxide gas, and a gel composition which suppress the initial rapid generation of the chlorine dioxide gas and stably hold the generation of the chlorine dioxide gas for an extremely long time.

DESCRIPTION OF EMBODIMENTS

Embodiment 1

Method for Generating Chlorine Dioxide Gas

Figure 1:
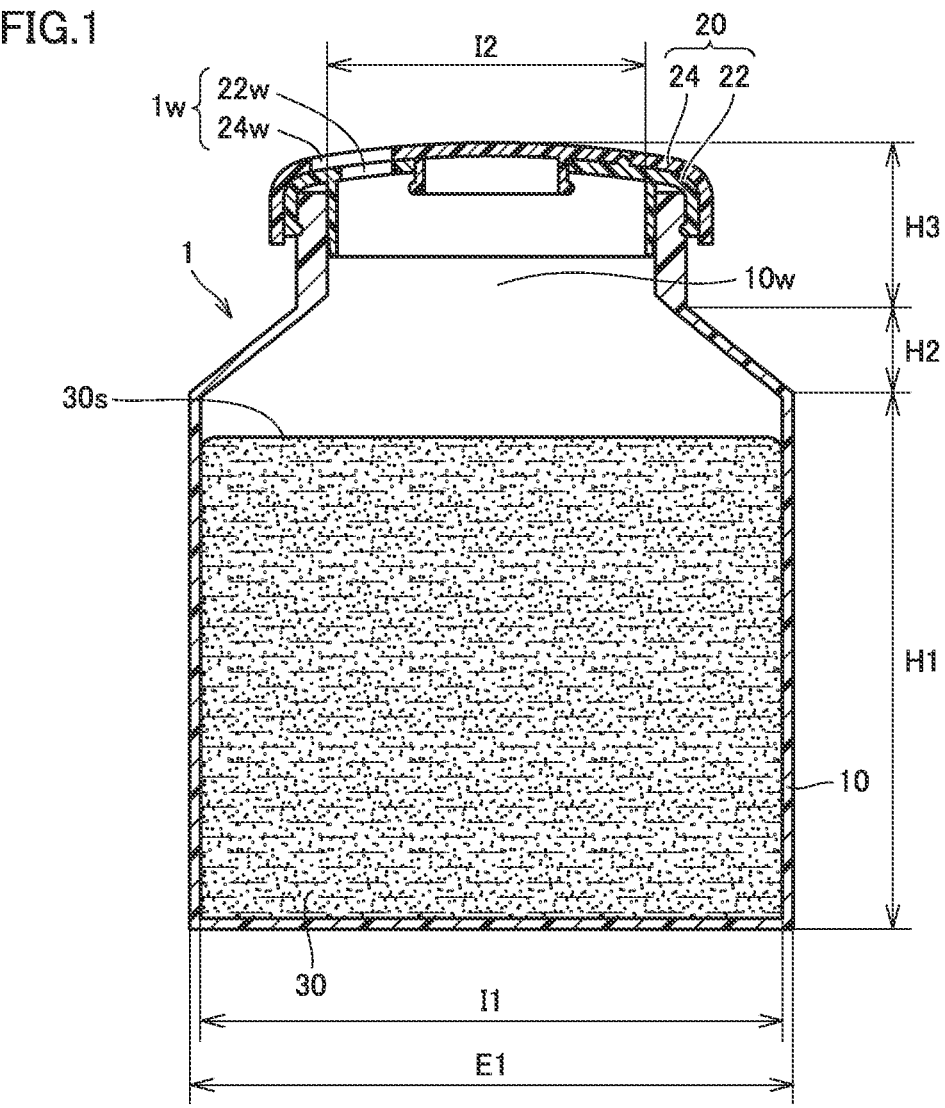
FIG. 1 is a schematic diagram showing an example of a container including a gel composition.
Figure 2:
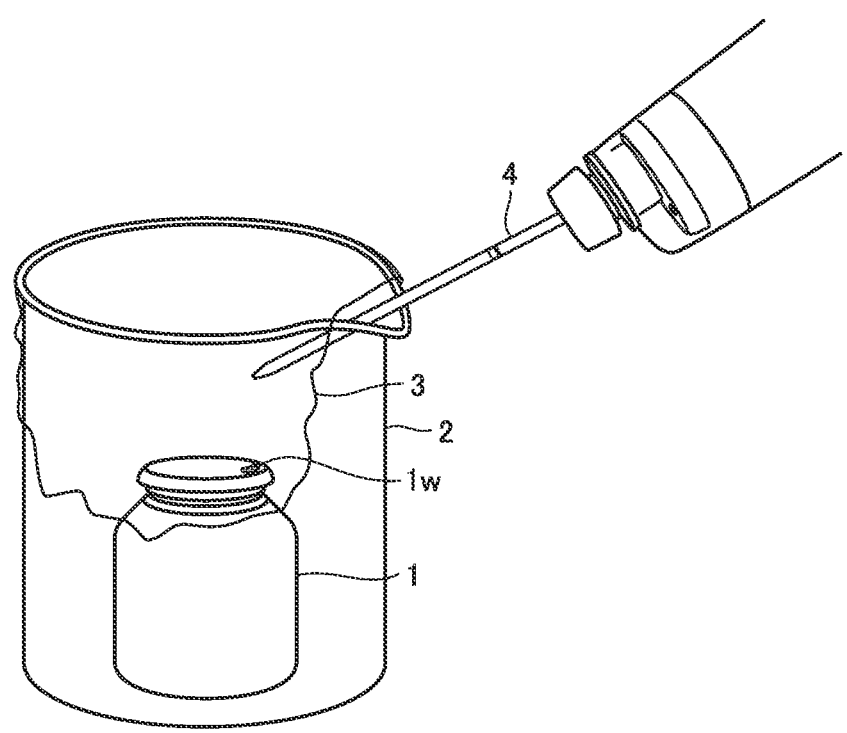
FIG. 2 is a schematic diagram showing a method for measuring the concentration of a chlorine dioxide gas generated from a gel composition.

A method for generating a chlorine dioxide gas according to an embodiment of the present invention, the method includes continuously generating the chlorine dioxide gas from a gel composition obtained by adding a gelling activator containing a gas generating agent, a gas generation controlling agent containing a carbonate and hydrogen peroxide, a gas generation adjusting agent, and a water-absorbent resin to a chlorite aqueous solution. In the method for generating a chlorine dioxide gas of the present embodiment, the gas generation controlling agent and the gas generation adjusting agent can suppress the initial rapid generation of the chlorine dioxide gas, and stably hold the generation of the chlorine dioxide gas for an extremely long time. Herein, the term "initial" means, for example, a period by the lapse of 72 hours (particularly, the lapse of 24 hours) from the addition of the gelling activator to the chlorite aqueous solution.

In the method for generating a chlorine dioxide gas of the present embodiment, it is specified that "adding the gelling activator to the chlorite aqueous solution", but by "adding the chlorite aqueous solution to the gelling activator", essentially the same function effect can be obtained. That is, the case of "adding the chlorite aqueous solution to the gelling activator" is equivalent to the case of "adding the gelling activator to the chlorite aqueous solution".

In the method for generating a chlorine dioxide gas of the present embodiment, from the viewpoint of stably holding the generation of the chlorine dioxide gas for an extremely long time, it is preferable that the gel composition has a flat surface from which the chlorine dioxide gas is generated.

In the method for generating a chlorine dioxide gas of the present embodiment, from the viewpoint that the production and generation of the chlorine dioxide gas due to the decomposition of the chlorite in the chlorite aqueous solution before the gelling activator is added can be suppressed to stably preserve the chlorite aqueous solution for a long period of time, and the gelling activator is added to stably and continuously generate the chlorine dioxide gas for a long time, it is preferable that the chlorite aqueous solution is enclosed in an airtight container before the gelling activator is added.

In the method for generating a chlorine dioxide gas of the present embodiment, from the viewpoints of making it possible to suppress the deterioration of the gelling activator before being added to the chlorite aqueous solution to stably preserve the gelling activator for a long time, and of adding the gelling activator to the chlorite aqueous solution to stably and continuously generate the chlorine dioxide gas for a long time, it is preferable that the gelling activator is enclosed in the airtight container before being added to the chlorite aqueous solution.

Chlorite Aqueous Solution

The chlorite aqueous solution used in the method for generating a chlorine dioxide gas of the present embodiment is a liquid containing a chlorite, and contains water as a main component (meaning that the content of water in a solvent and/or a dispersion medium excluding a solute and/or a dispersoid such as a chlorite is greater than or equal to 50% by mass, the same applies to the following). The chlorite aqueous solution can dissolve and/or disperse a gelling activator containing a gas generating agent, a gas generation controlling agent, a gas generation adjusting agent, and a water-absorbent resin. By adding the gelling activator to the chlorite aqueous solution, a gel composition is formed, and the chlorine dioxide gas is continuously generated from the formed gel composition via its surface. From the viewpoint of safely, stably, and continuously generating the chlorine dioxide gas for a long time from the gel composition gelled by adding the gelling activator to the chlorite aqueous solution, it is preferable that the chlorite aqueous solution is an aqueous solution or an aqueous dispersion.

The chlorite contained in the chlorite aqueous solution is not particularly limited as long as it generates the chlorine dioxide gas due to the presence of the gas generating agent described later. Examples thereof include chlorites of Group 1 elements (alkali metal elements) except hydrogen such as sodium chlorite ($NaClO_2$), potassium chlorite ($KClO_2$), and lithium chlorite ($LiClO_2$), and chlorites of Group 2 elements such as calcium chlorite ($Ca(ClO_2)_2$), strontium chlorate ($Sr(ClO_2)_2$), barium chlorite ($Ba(ClO_2)_2$), and magnesium chlorite ($Mg(ClO_2)_2$). Among these, commercially available sodium chlorite is readily available, which causes no problem in use.

The chlorite aqueous solution is obtained by dissolving the above chlorite in a predetermined concentration in an aqueous solution. When sodium chlorite is dissolved in an aqueous solution, a commercially available 25% by mass sodium chlorite aqueous solution used as a bleaching agent is suitably used as a liquid, and a commercially available 86% by mass product, a 80% by mass product, a 79% by mass product, or a 76% by mass product is suitably used as a solid. From the viewpoint that the chlorite aqueous solution does not correspond to a poisonous substance and a hazardous substance, and is easily treated, the concentration of the chlorite aqueous solution is preferably less than 25% by mass, more preferably less than 15% by mass, and still more preferably less than or equal to 10% by mass.

The chlorite aqueous solution is preferably alkaline, more preferably has a pH of greater than or equal to 9 and less than or equal to 13, and still more preferably has a pH of greater than or equal to 10 and less than or equal to 12.5. It is possible to suppress the production and generation of the chlorine dioxide gas due to the decomposition of the chlorite in the chlorite aqueous solution before the addition of the gelling activator to stably preserve the chlorite aqueous solution for a long period of time, and to add the gelling activator to stably and continuously generate the chlorine dioxide gas for a long of time.

It is preferable that the chlorite aqueous solution further contains an alkaline agent in order to make the chlorite aqueous solution alkaline. The alkaline agent is not particularly limited as long as the alkaline agent is dissolved and/or dispersed in the chlorite aqueous solution to cause the chlorite aqueous solution to exhibit alkalinity, but from the viewpoint that, by adding the gelling activator, the generation of the chlorine dioxide gas is not hindered even under an acidic atmosphere, sodium hydroxide (NaOH) and potassium hydroxide (KOH) and the like are preferred. Potassium hydroxide is particularly preferred from the viewpoint that potassium hydroxide, unlike sodium hydroxide, does not react with carbon dioxide in the atmosphere to form a salt such as sodium bicarbonate, and from the viewpoint that potassium hydroxide is likely to wet, penetrate, and being mixed with the gelling activator during hydration as compared with sodium hydroxide, to further facilitate the formation of the gel composition.

It is preferable that the chlorite aqueous solution is enclosed in the airtight container before the gelling activator is added. By enclosing the chlorite aqueous solution in the airtight container, the generation of the chlorine dioxide gas due to the decomposition of the chlorite in the chlorite aqueous solution before the addition of the gelling activator can be suppressed, to stably preserve the chlorite aqueous solution for a long period of time, and by adding the gelling activator, the chlorine dioxide gas can be stably and continuously generated for a long time. Herein, the airtight container means a container not permeating a gas such as water vapor, a liquid such as moisture, and a solid. Specifically, the airtight container means a container having a mass change of less than or equal to 0.7 g before and after being allowed to stand in a thermostatic chamber at 50° C. for 2 months (60 days) in a state where the container encloses 85 g of a 8.7% by mass sodium chlorite aqueous solution. From the viewpoints of low reactivity with the chlorite aqueous solution and stable preservation of the chlorite aqueous solution for a long period of time, various plastic containers are preferred.

Gas Generating Agent

The gas generating agent used in the method for generating a chlorine dioxide gas of the present embodiment has a function of stably keeping a pH atmosphere in the gel composition in a weak alkali state or acidic state required for generating the chlorine dioxide gas from the chlorite, to generate chlorine dioxide. The gas generating agent is a constituent of the gelling activator, and is a solid. Herein, the pH atmosphere in the gel composition is not particularly limited, and from the viewpoint of stably and continuously producing the chlorine dioxide gas for a long time, the pH atmosphere has preferably a pH of greater than or equal to 2 and less than or equal to 9, and more preferably a pH of greater than or equal to 3 and less than or equal to 7.

The gas generating agent is not particularly limited, and from the viewpoint of preferably keeping the pH atmosphere in the gel composition at greater than or equal to 2 and less than or equal to 9 to stably and continuously produce the chlorine dioxide gas for a long time, the gas generating agent preferably contains at least one substance selected from the group consisting of a salt of a weak acid having an acid dissociation constant $pK_a$ of greater than or equal to 2.5, a weak acid having an acid dissociation constant $pK_a$ of greater than or equal to 3.8, an amphoteric compound having both acidic and alkaline functional groups, and a heterocyclic compound having a pyrimidine structure.

Examples of the salt of a weak acid having an acid dissociation constant $pK_a$ of greater than or equal to 2.5 include sodium citrate as a salt of citric acid ($pK_{a1}$: 2.90, $pK_{a2}$: 4.35, $pK_{a3}$: 5.69), and sodium malate as a salt of malic acid ($pK_{a1}$: 3.23, $pK_{a1}$: 4.77). Herein, there are three kinds of sodium citrates: monosodium citrate, disodium citrate, and trisodium citrate. Among these, disodium citrate and trisodium citrate are more preferred. There are two kinds of sodium malates: monosodium malate and disodium malate. Among these, disodium malate is more preferred. Herein, the salt of a weak acid may be an anhydrous salt or a water-containing salt.

Examples of the weak acid having an acid dissociation constant $pK_a$ of greater than or equal to 3.8 include succinic acid ($pK_{a1}$: 3.99, $pK_{a2}$: 5.20), and boric acid ($pK_{a1}$: 9.23, $pK_{a2}$: 12.74, $pK_{a3}$: 13.52).

Examples of the amphoteric compound include amino acids having a carboxyl group (COOH group) as an acidic functional group, and an amino group ($NH_2$ group) as an alkaline functional group. Examples of the amino acids include glycine, alanine, valine, leucine, and isoleucine having an alkyl chain, serine and triionine having a hydroxy group (OH group), asparagine and glutamine having an amide group (RCONH group), proline having an imino group (C=NH group or CNHC group), phenylalanine, tyrosine and tryptophan having a phenyl group ($C_6H_5$ group), aspartic acid and glutamic acid having greater than or equal to two carboxyl groups (COOH group), and ricin and arginine having greater than or equal to two amino groups ($NH_2$ group).

Examples of the heterocyclic compound having a pyrimidine structure include barbituric acid, and orotic acid.

From the viewpoint of stably and continuously promoting the production of the chlorine dioxide gas for a long time while preferably keeping the pH atmosphere in the gel composition at greater than or equal to 2 and less than or equal to 9, the gas generating agent preferably further contains a weak acid having an acid dissociation constant $pK_a$ of greater than or equal to 2.5 and a first acid dissociation constant $pK_{a1}$ of less than 3.8. From the viewpoint of high safety, the weak acid is preferably organic acid used as a food additive. Examples of the organic acid having an acid dissociation constant $pK_a$ of greater than or equal to 2.5 and a first acid dissociation constant $pK_{a1}$ of less than 3.8 include carboxylic acids such as citric acid ($pK_{a1}$: 2.90, $pK_{a2}$: 4.35, $pK_{a3}$: 5.69), malic acid ($pK_{a1}$: 3.23, $pK_{a2}$: 4.77), formic acid ($pK_{a1}$: 3.54), lactic acid ($pK_{a1}$: 3.64), and tartaric acid (in a (+) form, $pK_{a1}$: 2.87, $pK_{a2}$: 3.97: in a meso form, $pK_{a1}$: 2.95, $pK_{a2}$: 4.46).

Herein, when the salt of a weak acid having an acid dissociation constant $pK_a$ of greater than or equal to 2.5 and the weak acid having an acid dissociation constant $pK_a$ of greater than or equal to 2.5 and a first acid dissociation constant $pK_{a1}$ of less than 3.8 are used, from the viewpoint of more stably maintaining the pH atmosphere in the gel composition, the salt of a weak acid and the weak acid are preferably conjugate salts and acids. For example, when a citrate salt is used as the salt of a weak acid, it is preferable to use citric acid as the weak acid, and when a malate is used as the salt of a weak acid, it is preferable to use malic acid as the weak acid.

Gas Generation Controlling Agent

The gas generation controlling agent used in the method for generating a chlorine dioxide gas of the present embodiment has a function of controlling the generation of the chlorine dioxide from the chlorite due to the gas generating agent according to a chemical action. The gas generation controlling agent is a constituent of the gelling activator, and is a solid. The gas generation controlling agent contains a carbonate and hydrogen peroxide. The carbonate contained in the gas generation controlling agent reacts with the gas generating agent for stably keeping the pH atmosphere in the gel composition in a weak alkali state or acidic state required for the generation of the chlorine dioxide gas from the chlorite to generate a carbon dioxide gas. This suppresses the rapid generation of the chlorine dioxide gas in the initial formation of the gel composition obtained by adding the gelling activator to the chlorite aqueous solution. Since the generated carbon dioxide gas is released from the surface of the gel composition, the gel composition has a constant flat surface. Therefore, the chlorine dioxide gas is stably and continuously generated for a long time from the gel composition via the surface. Hydrogen peroxide contained in the gas generation controlling agent decreases the generated chlorine dioxide gas by reducing. This suppresses the rapid generation of the chlorine dioxide gas in the initial formation of the gel composition obtained by adding the gelling activator to the chlorite aqueous solution.

The gas generation controlling agent containing a carbonate and hydrogen peroxide is not particularly limited, and from the viewpoint of suppressing the rapid generation of the chlorine dioxide from the chlorite to stably maintain the generation of the chlorine dioxide for a long time, sodium carbonate hydrogen peroxide (denoted as $Na_2CO_3.1.5H_2O_2$ or $2Na_2CO_3.3H_2O_2$), and potassium carbonate hydrogen peroxide (denoted as $K_2CO_3.1.5H_2O_2$ or $2K_2CO_3.3H_2O_2$) and the like are preferred, and from the viewpoint of easy availability, sodium carbonate hydrogen peroxide is more preferred. Herein, sodium carbonate hydrogen peroxide refers to an adduct compound in which sodium carbonate and hydrogen peroxide are mixed at a molar ratio of 2:3, and is referred to as a sodium carbonate hydrogen peroxide adduct according to the Japanese law.

Gas Generation Adjusting Agent

The gas generation adjusting agent used in the method for generating a chlorine dioxide gas of the present embodiment has a function of adjusting the generation of the chlorine dioxide from the chlorite due to the gas generating agent according to a physical action. That is, the gas generation adjusting agent has functions of maintaining at least part of the chlorine dioxide gas in the surface of the gel composition and/or in the gel composition when the amount of the chlorine dioxide gas generated from the chlorite is large, and of releasing the chlorine dioxide gas maintained when the amount of the chlorine dioxide gas generated from the chlorite is small or zero, to continuously generate the chlorine dioxide gas from the gel composition. The gas generation adjusting agent is a constituent of the gelling activator, and is a solid.

The material and shape of the gas generation adjusting agent are not particularly limited as long as the gas generation adjusting agent can efficiently disperse the generation of the chlorine dioxide gas, and from the viewpoint of being capable of maintaining a large amount of the chlorine dioxide gas, the gas generation adjusting agent is preferably a porous material having a large surface area. At least one selected from the group consisting of sepiolite, montmorillonite, diatomaceous earth, talc, and zeolite is preferred. From the viewpoint of increasing the surface area, the gas generation adjusting agent is preferably powdery, granular and/or porous.

Among the gas generation adjusting agents, from the viewpoint of excellent holding and release of the chlorine dioxide gas, sepiolite is preferred. Herein, sepiolite is a natural mineral of a magnesium silicate salt, and its chemical composition formula is represented by $Mg_8S_{12}O_{30}(OH)_4(OH_2)_4.8H_2O$. Sepiolite has a fibrous crystal structure, has a large number of grooves on its surface, has a large number of clearances having a cylindrical tunnel structure, and has a very large surface area. Examples of commercially available products include Miraclay (manufactured by Omi Mining Co., Ltd.). Examples of the powdery diatomaceous earth include Celite (trade name, manufactured by Showa Chemical Co., Ltd.).

Water-Absorbent Resin

The water-absorbent resin used in the method for generating a chlorine dioxide gas of the present embodiment has a function of absorbing moisture to form the gel composition. The water-absorbent resin is a constituent of the gelling activator, and is a solid. For example, a starch-based water-absorbent resin, a cellulose-based water-absorbent resin, and a synthetic polymer-based water-absorbent resin and the like are preferably used. Examples of the starch-based water-absorbent resin include a starch/polyacrylic acid-based resin (powder manufactured by Sanyo Chemical Industries, Ltd.), and examples of the synthetic polymer-based water-absorbent resin include a crosslinked polyacrylic acid-based resin, an isobutylene/maleic acid-based resin, a poval/polyacrylate-based resin, and a polyacrylic acid-based resin. Specifically, sodium polyacrylate and the like are used.

Gelling Activator

The gelling activator used in the method for generating a chlorine dioxide gas of the present embodiment is added to the chlorite aqueous solution to form the gel composition, and the gelling activator has a function of stably and continuously generating the chlorine dioxide gas from the formed gel composition. The gelling activator contains a gas generating agent, a gas generation controlling agent containing a carbonate and hydrogen peroxide, a gas generation adjusting agent, and a water-absorbent resin. Herein, from the viewpoint of forming a homogeneous gel composition, it is preferable that the gelling activator is added to the chlorite aqueous solution to form the gel composition, and the gelling activator has a function of stably and continuously generating the chlorine dioxide gas from the formed gel composition, and contains one obtained by sufficiently mixing a gas generating agent, a gas generation controlling agent containing a carbonate and hydrogen peroxide, a gas generation adjusting agent, and a water-absorbent resin.

The gelling activator is preferably enclosed in an airtight container before being added to the chlorite aqueous solution. Before the addition of the gelling activator to the chlorite aqueous solution, the gelling activator is enclosed in the airtight container, whereby the mixing of moisture from the atmosphere into the gelling activator is prevented, which provides prevented deterioration. Therefore, the gelling activator can be stably preserved for a long period of time. Herein, the airtight container means a container not permeating a gas such as water vapor, a liquid such as moisture, and a solid. Specifically, the airtight container means a container having a mass change of less than or equal to 0.7 g before and after being allowed to stand in a thermostatic chamber at 50° C. for 2 months (60 days) in a state where the container encloses 85 g of a 8.7% by mass sodium chlorite aqueous solution. Examples thereof include various plastic containers.

Flatness of Surface of Gel Composition from Which Chlorine Dioxide Gas is Generated In the method for generating a chlorine dioxide gas of the present embodiment, from the viewpoint of keeping the surface area of the surface from which the chlorine dioxide gas is generated constant, to stably hold the generation of the chlorine dioxide gas for an extremely long time, the gel composition preferably has a flat surface from which the chlorine dioxide gas is generated. Herein, the flatness of the surface of the gel composition from which the chlorine dioxide gas is generated means that the surface is visually flat with no local protrusion of the surface due to the addition of the gelling activator to the chlorite aqueous solution. Furthermore, from the viewpoint of keeping the surface area of the surface from which the chlorine dioxide gas is generated constant, to stably hold the generation of the chlorine dioxide gas for an extremely long time, it is more preferable that the surface of the gel composition from which the chlorine dioxide gas is generated is flat, and cracks do not occur.

Embodiment 2

Kit for Generating Chlorine Dioxide Gas

A kit for generating a chlorine dioxide gas according to another embodiment of the present invention is a kit including: an agent (A) containing a chlorite aqueous solution; and an agent (B) containing a gelling activator containing a gas generating agent, a gas generation controlling agent containing a carbonate and hydrogen peroxide, a gas generation adjusting agent, and a water-absorbent resin, wherein the chlorine dioxide gas is continuously generated by adding the agent (B) to the agent (A). In the kit for generating a chlorine dioxide gas of the present embodiment, the gas generation controlling agent and the gas generation adjusting agent contained in the agent (B) can suppress the initial rapid generation of the chlorine dioxide gas and stably hold the generation of the chlorine dioxide gas for an extremely long time.

In the kit for generating a chlorine dioxide gas of the present embodiment, it is specified that "adding the agent (B) to the agent (A)", but by "adding the agent (A) to the agent (B)", essentially the same function effect can be obtained. That is, the case of "adding the agent (A) to the agent (B)" is equivalent to the case of "adding the agent (B) to the agent (A)".

In the kit for generating a chlorine dioxide gas of the present embodiment, from the viewpoints that the generation of the chlorine dioxide gas due to the decomposition of the chlorite in the chlorite aqueous solution in the agent (A) before the addition of the agent (B) can be suppressed to stably preserve the chlorite aqueous solution for a long period of time, and the agent (B) is added to suppress the initial rapid generation of the chlorine dioxide gas and to stably and continuously generate the chlorine dioxide gas for a long time, the chlorite aqueous solution contained in the agent (A) is preferably alkaline, more preferably has a pH of greater than or equal to 9 and less than or equal to 13, and still more preferably has a pH of greater than or equal to 10 and less than or equal to 12.5.

It is preferable that the agent (A) as one element of the kit for generating a chlorine dioxide gas of the present embodiment is enclosed in an airtight container before the addition of the agent (B). The production and generation of the chlorine dioxide gas due to the decomposition of the chlorite in the chlorite aqueous solution in the agent (A) before the addition of the agent (B) can be suppressed to stably preserve the agent (A) containing the chlorite aqueous solution for a long period of time, and the agent (B) can be added to stably and continuously generate the chlorine dioxide gas for a long time. Herein, the airtight container means a container not permeating a gas such as water vapor, a liquid such as moisture, and a solid. From the viewpoints of low reactivity with the chlorite aqueous solution and stable preservation of the chlorite aqueous solution for a long period of time, various plastic containers are preferred.

It is preferable that the agent (B) as another element constituting the kit for generating a chlorine dioxide gas of the present embodiment is enclosed in the airtight container before being added to the agent (A). The gelling activator in the agent (B) is enclosed in the airtight container, whereby the mixing of moisture from the atmosphere into the gelling activator is prevented, which provides prevented deterioration. Therefore, the agent (B) containing the gelling activator can be stably preserved for a long period of time. Herein, the airtight container means a container not permeating a gas such as water vapor, a liquid such as moisture, and a solid. Examples thereof include various plastic containers.

From the viewpoint of forming a homogeneous gel composition to continuously generate the chlorine dioxide gas for an extremely long time, it is preferable that the agent (B) contains a gelling activator obtained by sufficiently mixing a gas generating agent, a gas generation controlling agent containing a carbonate and hydrogen peroxide, a gas generation adjusting agent, and a water-absorbent resin.

In the kit for generating a chlorine dioxide gas of the present embodiment, the chlorite aqueous solution, the gas generating agent, the gas generation controlling agent containing a carbonate and hydrogen peroxide, the gas generation adjusting agent, the water-absorbent resin, and the gelling activator are the same as the chlorite aqueous solution, the gas generating agent, the gas generation controlling agent containing a carbonate and hydrogen peroxide, the gas generation adjusting agent, the water-absorbent resin, and the gelling activator in the method for generating a chlorine dioxide gas of the embodiment 1, and the descriptions thereof will not be repeated herein.

From the viewpoints of suppressing the initial rapid generation of the chlorine dioxide gas and of stably holding the generation of the chlorine dioxide gas for an extremely long time, in the kit for generating a chlorine dioxide gas of the present embodiment, it is preferable that the amounts of the agents (A) and (B) are respectively 60% by mass to 90% by mass, and 10% by mass to 40% by mass based on the whole kit. It is preferable that the amounts of a chlorite component and an aqueous solution component in the chlorite aqueous solution are respectively 2% by mass to 20% by mass and 80% by mass to 98% by mass in terms of pure content based on the whole agent (A). It is preferable that the amounts of the gas generating agent, the gas generation controlling agent, the gas generation adjusting agent, and the water-absorbent resin in the gelling activator are respectively 10% by mass to 60% by mass, 0.1% by mass to 15% by mass, 5% by mass to 60% by mass, and 15% by mass to 90% by mass based on the whole agent (B).

The specific form of the kit for generating a chlorine dioxide gas of the present embodiment is not particularly limited, and examples thereof include a form in which an airtight container enclosing the agent (A) (for example, the chlorite aqueous solution) and an airtight container enclosing the agent (B) (for example, the gelling activator containing the gas generating agent, the gas generation controlling agent containing a carbonate and hydrogen peroxide, the gas generation adjusting agent, and the water-absorbent resin) are packaged together, and a form in which one obtained by packaging a container enclosing the agent (A) (for example, the chlorite aqueous solution) and one obtained by packaging a container enclosing the agent (B) (for example, the gelling activator containing the gas generating agent, the gas generation controlling agent containing a carbonate and hydrogen peroxide, the gas generation adjusting agent, and the water-absorbent resin) are combined.

Embodiment 3

Gel Composition

A gel composition according to still another embodiment of the present invention includes: a chlorite aqueous solution; and a gelling activator containing a gas generating agent, a gas generation controlling agent containing a carbonate and hydrogen peroxide, a gas generation adjusting agent, and a water-absorbent resin, wherein a chlorine dioxide gas is continuously generated. The gas generation controlling agent and gas generation adjusting agent contained in the gel composition of the present embodiment can suppress the initial rapid generation of the chlorine dioxide gas and stably hold the generation of the chlorine dioxide gas for an extremely long tune.

According to the method for generating a chlorine dioxide gas of the embodiment 1, the gel composition of the present embodiment is gelled by adding a gelling activator containing a gas generating agent, a gas generation controlling agent containing a carbonate and hydrogen peroxide, a gas generation adjusting agent, and a water-absorbent resin to a chlorite aqueous solution. More specifically, the gel composition of the present embodiment is gelled by adding an agent (B) containing a gelling activator containing a gas generating agent, a gas generation controlling agent containing a carbonate and hydrogen peroxide, a gas generation adjusting agent, and a water-absorbent resin to an agent (A) containing a chlorite aqueous solution, using the kit for generating a chlorine dioxide gas of the embodiment 2.

From the viewpoint of keeping the surface area of the surface from which the chlorine dioxide gas is generated constant in the gel composition of the present embodiment, to stably hold the generation of the chlorine dioxide gas for an extremely long time, the gel composition preferably has a flat surface from which the chlorine dioxide gas is generated. Herein, the flatness of the surface of the gel composition from which the chlorine dioxide gas is generated means that the surface is visually flat with no local protrusion of the surface due to the addition of the gelling activator to the chlorite aqueous solution. Furthermore, from the viewpoint of keeping the surface area of the surface from which the chlorine dioxide gas is generated constant, to stably hold the generation of the chlorine dioxide gas for an extremely long time, it is more preferable that the surface of the gel composition from which the chlorine dioxide gas is generated is flat, and cracks do not occur.

In the gel composition of the present embodiment, the chlorite aqueous solution, the gas generating agent, the gas generation controlling agent containing a carbonate and hydrogen peroxide, the gas generation adjusting agent, the water-absorbent resin, and the gelling activator are the same as the chlorite aqueous solution, the gas generating agent, the gas generation controlling agent containing a carbonate and hydrogen peroxide, the gas generation adjusting agent, the water-absorbent resin, and the gelling activator in the method for generating a chlorine dioxide gas of the embodiment 1, and the descriptions thereof will not be repeated herein.

From the viewpoints of suppressing the initial rapid generation of the chlorine dioxide gas and of stably holding the generation of the chlorine dioxide gas for an extremely long time, in the gel composition of the present embodiment, it is preferable that the amounts of the chlorine component in the chlorite aqueous solution, the aqueous solution component in the chlorite aqueous solution, the gas generating agent, the gas generation controlling agent, the gas generation adjusting agent, and the water-absorbent resin are respectively 2.5% by mass to 10% by mass, 50% by mass to 95% by mass, 2% by mass to 15% by mass, 0.03% by mass to 3% by mass, 1.5% by mass to 15% by mass, and 2.5% by mass to 20% by mass in terms of pure content.

EXAMPLES

Preparation of Container for Generating Chlorine Dioxide Gas

As shown in FIG. 1, a container 1 for generating a chlorine dioxide gas was prepared, which included a plastic body 10 and a plastic lid 20. The plastic body 10 was a substantially cylindrical container having an opening, and had a bottom portion having an outer diameter E1 of 64 mm and an inner diameter I1 of 60 mm, a top portion having an opening having an inner diameter I2 of 37 mm, a cylindrical tubular body portion having a height H1 of 64 mm and a volume of 174 ml, a truncated conical cylindrical shoulder portion having a height H2 of 11 mm, and a cylindrical tubular neck portion having a height H3 of 15 mm. The plastic lid 20 included an inner lid 22 having an opening 22w and an outer lid 24 having an opening 24w. The inner lid 22 and the outer lid 24 were disposed so as to be slidably rotatable around a central portion. An overlapping portion of the opening 22w of the inner lid 22 and the opening 24w of the outer lid 24 constituted an opening 1w of the container 1 for generating a chlorine dioxide gas.

Preparation of Chlorite Aqueous Solution

As a chlorite aqueous solution, a 25% by mass sodium chlorite aqueous solution (25% sodium chlorite aqueous solution manufactured by Daiso Co., Ltd.) was diluted with pure water to prepare a 8.7% by mass sodium chlorite aqueous solution, Preparation of Gelling Activator As a gelling activator for examples, 3,195 g of trisodium citrate dihydrate and 1,755 g of anhydrous citric acid as a gas generating agent, 5,040 g of a polvacrylic acid-based water-absorbent resin (Sun Fresh ST-500D manufactured by Sanyo Kasei Co., Ltd.) as a water-absorbent resin, 1,800 g of a sepiolite powder (Miraclay P-150D manufactured by Omi Kogyo Co., Ltd.) as a gas generation adjusting agent, and 180 g of sodium carbonate hydrogen peroxide as a gas generation controlling agent were uniformly mixed to prepare a mixed powder. As a gelling activator for comparative examples, one obtained by removing sodium carbonate hydrogen peroxide as the gas generation controlling agent from the gelling activator for examples was uniformly mixed to prepare a mixed powder.

Example 1

In a thermostatic chamber having a temperature of 20.3° C. and a humidity (referred to as relative humidity, the same applies to the following) of 69%, 117.25 g of the chlorite aqueous solution (8.8% by mass of sodium chlorite aqueous solution) was placed in a plastic body 10 of a container 1 for generating a chlorine dioxide gas shown in FIG. 1, and 33.25 g of the gelling activator for examples (for the composition of each component, trisodium citrate dihydrate: 8.875 g, anhydrous citric acid: 4.875 g, polyacrylic acid-based water-absorbent resin: 14 g, sepiolite powder: 5 g, sodium carbonate hydrogen peroxide: 0.5 g) was then added. Thereafter, an opening 10w of the plastic body 10 was covered with a plastic lid 20, and an inner lid 22 and an outer lid 24 were disposed such that an opening 1w of an overlapping portion of an opening 22w of the inner lid 22 and an opening 24w of the outer lid 24 become maximum. The maximum opening 1w of the container 1 for generating a chlorine dioxide gas had a substantially trapezoidal shape, had an upper base of 7 mm, a lower base of 10 mm, and a height of 5 mm, and had an area of 42.5 mm². After 4 minutes from the addition of the gelling activator to the chlorite aqueous solution, the chlorite aqueous solution was gelled to obtain a gel composition 30. A gel time was 4 minutes. A surface 30s of the obtained gel composition 30 was flat (visually flat with no local protrusion of the surface due to the addition of the gelling activator for examples to the chlorite aqueous solution). No cracks occurred in the surface 30s of the gel composition 30.

Next, the container 1 for generating a chlorine dioxide gas containing the chlorite aqueous solution and the gelling activator for examples was placed in a beaker 2 having a volume of 1 liter, and the beaker 2 was covered with a plastic film 3 excluding a pouring spout portion of the beaker. Then, the beaker including the container 1 for generating a chlorine dioxide gas in which the gel composition was formed was allowed to stand in a thermostatic chamber having a temperature of 19.7° C. to 20.7° C. and a relative humidity of 36% to 88%, and a Kitagawa type detecting tube 4 was inserted from the pouring spout of the beaker after the lapse of a predetermined time from the addition of the gelling activator for examples to the chlorite aqueous solution to measure the concentration of the generated chlorine dioxide gas, thereby examining its time-dependent change. The results were shown in Tables 1 and 2 and FIGS. 3 and 4.

Comparative Example 1

A gel composition was formed in the same manner as in Example 1 except that, in place of 33.25 g of the gelling activator for examples, 32.75 g of the gelling activator for comparative examples (for the composition of each component, trisodium citrate dihydrate: 8.875 g, anhydrous citric acid: 4.875 g, polyacrylic acid-based water-absorbent resin: 14 g, sepiolite powder: 5 g) was used. A gel time was 4 minutes. In the surface of the obtained gel composition, local protrusion was formed by the addition of the gelling activator for comparative examples to a chlorite aqueous solution. Cracks occurred in the surface of the gel composition.

Then, in the same manner as in Example 1, the concentration of the generated chlorine dioxide gas was measured after the lapse of a predetermined time from the addition of the gelling activator for comparative examples to the chlorite aqueous solution, to examine its time-dependent change. The results were summarized in Tables 1 and 2 and FIGS. 3 and 4.

TABLE 1

| | | | $ClO_2$ concentration (ppm) | |
|---|---|---|---|---|
| Lapse time (hr) | Temperature (° C.) | Humidity (%) | Comparative Example 1 | Example 1 |
| 0 | 20.3 | 69 | 0 | 0 |
| 0.5 | 20.3 | 69 | 42 | 39 |
| 1 | 20.3 | 69 | 50 | 42 |
| 2.5 | 20.6 | 74 | 65 | 45 |
| 5 | 20.1 | 70 | 70 | 38 |
| 8 | 20.2 | 69 | 58 | 35 |
| 11 | 20.6 | 69 | 65 | 35 |
| 22 | 20.4 | 77 | 60 | 36 |
| 56 | 20.7 | 76 | 65 | 56 |
| 71 | 20.0 | 70 | 60 | 58 |
| 95 | 20.0 | 75 | 59 | 56 |
| 119 | 20.2 | 77 | 63 | 55 |
| 143 | 20.4 | 78 | 63 | 53 |
| 191 | 20.4 | 71 | 56 | 53 |
| 215 | 20.4 | 70 | 58 | 56 |
| 239 | 20.2 | 70 | 59 | 56 |
| 287 | 20.0 | 79 | 64 | 57 |
| 324 | 20.1 | 71 | 60 | 57 |
| 348 | 20.2 | 78 | 60 | 57 |
| 372 | 19.8 | 70 | 60 | 57 |
| 396 | 19.8 | 86 | 61 | 58 |
| 414 | 19.9 | 74 | 55 | 58 |

TABLE 1-continued

| Lapse time (hr) | Temperature (° C.) | Humidity (%) | ClO₂ concentration (ppm) | |
|---|---|---|---|---|
| | | | Comparative Example 1 | Example 1 |
| 438 | 19.9 | 80 | 61 | 58 |
| 462 | 20.0 | 77 | 55 | 56 |
| 491 | 20.2 | 80 | 54 | 56 |
| 509 | 20.0 | 82 | 54 | 55 |
| 524 | 20.0 | 83 | 55 | 55 |
| 564 | 20.1 | 84 | 51 | 55 |
| 600 | 20.1 | 84 | 55 | 56 |
| 624 | 20.1 | 87 | 45 | 54 |
| 648 | 19.8 | 86 | 46 | 54 |
| 672 | 20.2 | 88 | 51 | 55 |
| 696 | 20.2 | 84 | 45 | 55 |
| 720 | 20.0 | 84 | 45 | 55 |
| 744 | 19.9 | 82 | 55 | 55 |
| 768 | 20.1 | 84 | 54 | 56 |
| 804 | 20.3 | 84 | 54 | 55 |
| 812 | 19.9 | 84 | 54 | 55 |
| 836 | 20.2 | 84 | 50 | 55 |
| 875 | 19.9 | 85 | 49 | 54 |
| 883 | 20.1 | 84 | 48 | 55 |
| 907 | 20.0 | 84 | 50 | 55 |
| 931 | 20.2 | 81 | 50 | 54 |
| 955 | 20.1 | 84 | 45 | 54 |
| 981 | 20.2 | 87 | 46 | 55 |
| 1005 | 20.0 | 84 | 43 | 52 |
| 1029 | 20.1 | 84 | 40 | 52 |
| 1066 | 19.9 | 84 | 45 | 52 |
| 1077 | 20.1 | 84 | 50 | 53 |
| 1101 | 19.9 | 85 | 50 | 53 |
| 1125 | 20.0 | 74 | 48 | 52 |
| 1149 | 19.9 | 74 | 44 | 52 |
| 1173 | 19.9 | 70 | 44 | 51 |
| 1196 | 19.9 | 64 | 45 | 52 |
| 1233 | 19.9 | 61 | 45 | 50 |
| 1257 | 20.2 | 63 | 40 | 49 |
| 1268 | 19.9 | 63 | 44 | 50 |
| 1292 | 20.1 | 72 | 45 | 51 |
| 1317 | 19.9 | 79 | 45 | 50 |
| 1342 | 20.0 | 79 | 43 | 48 |
| 1366 | 19.9 | 80 | 38 | 46 |
| 1385 | 20.0 | 76 | 38 | 46 |
| 1414 | 19.8 | 72 | 40 | 44 |
| 1438 | 19.8 | 67 | 41 | 44 |
| 1462 | 19.9 | 62 | 40 | 43 |
| 1486 | 20.0 | 69 | 40 | 43 |

TABLE 2

| Lapse time (hr) | Temperature (° C.) | Humidity (%) | ClO₂ concentration (ppm) | |
|---|---|---|---|---|
| | | | Comparative Example 1 | Example 1 |
| 1507 | 20.0 | 69 | 40 | 43 |
| 1547 | 19.8 | 58 | 40 | 43 |
| 1563 | 19.9 | 63 | 40 | 44 |
| 1579 | 19.9 | 69 | 44 | 44 |
| 1616 | 19.7 | 55 | 39 | 44 |
| 1635 | 19.9 | 56 | 38 | 43 |
| 1653 | 19.9 | 61 | 38 | 42 |
| 1677 | 19.9 | 60 | 38 | 42 |
| 1701 | 19.9 | 58 | 38 | 42 |
| 1725 | 19.9 | 57 | 38 | 42 |
| 1759 | 20.0 | 54 | 40 | 42 |
| 1783 | 20.0 | 57 | 40 | 42 |
| 1807 | 19.8 | 52 | 40 | 41 |
| 1819 | 19.8 | 50 | 38 | 41 |
| 1843 | 19.8 | 52 | 38 | 41 |
| 1867 | 19.7 | 50 | 40 | 42 |
| 1891 | 20.0 | 56 | 40 | 42 |
| 1918 | 20.0 | 55 | 40 | 42 |
| 1940 | 19.8 | 57 | 38 | 42 |
| 1962 | 19.9 | 63 | 36 | 41 |

TABLE 2-continued

| Lapse time (hr) | Temperature (° C.) | Humidity (%) | ClO₂ concentration (ppm) | |
|---|---|---|---|---|
| | | | Comparative Example 1 | Example 1 |
| 1986 | 19.9 | 51 | 33 | 40 |
| 2010 | 19.9 | 42 | 32 | 39 |
| 2024 | 20.0 | 49 | 33 | 40 |
| 2057 | 20.0 | 40 | 35 | 39 |
| 2083 | 20.1 | 57 | 36 | 40 |
| 2107 | 19.9 | 65 | 33 | 40 |
| 2115 | 20.1 | 70 | 32 | 40 |
| 2131 | 19.9 | 65 | 33 | 40 |
| 2144 | 20.1 | 65 | 35 | 40 |
| 2155 | 19.9 | 65 | 35 | 40 |
| 2179 | 20.0 | 63 | 32 | 40 |
| 2191 | 20.0 | 65 | 32 | 40 |
| 2203 | 20.2 | 49 | 31 | 40 |
| 2216 | 20.0 | 50 | 32 | 41 |
| 2226 | 19.9 | 46 | 29 | 40 |
| 2239 | 19.9 | 48 | 30 | 40 |
| 2250 | 19.9 | 43 | 30 | 40 |
| 2264 | 20.1 | 50 | 35 | 40 |
| 2275 | 20.0 | 52 | 34 | 40 |
| 2288 | 20.1 | 55 | 34 | 40 |
| 2298 | 20.0 | 50 | 30 | 40 |
| 2312 | 20.0 | 45 | 30 | 40 |
| 2322 | 20.1 | 43 | 30 | 39 |
| 2336 | 20.0 | 43 | 30 | 40 |
| 2346 | 20.0 | 40 | 30 | 40 |
| 2360 | 20.0 | 45 | 30 | 40 |
| 2370 | 20.0 | 45 | 29 | 40 |
| 2384 | 20.1 | 51 | 35 | 40 |
| 2394 | 20.0 | 45 | 30 | 40 |
| 2408 | 20.0 | 45 | 34 | 39 |
| 2418 | 19.9 | 44 | 33 | 39 |
| 2431 | 19.9 | 46 | 33 | 39 |
| 2442 | 20.0 | 38 | 30 | 38 |
| 2455 | 20.0 | 50 | 32 | 40 |
| 2466 | 20.0 | 50 | 32 | 40 |
| 2479 | 20.0 | 50 | 32 | 40 |
| 2490 | 19.9 | 48 | 33 | 40 |
| 2503 | 20.0 | 42 | 31 | 39 |
| 2514 | 20.0 | 41 | 32 | 38 |
| 2527 | 20.0 | 40 | 29 | 39 |
| 2538 | 20.0 | 38 | 30 | 36 |
| 2551 | 20.0 | 41 | 30 | 36 |
| 2562 | 20.0 | 36 | 27 | 36 |
| 2575 | 20.0 | 40 | 29 | 35 |
| 2586 | 20.0 | 36 | 28 | 36 |
| 2599 | 19.9 | 37 | 28 | 36 |

Figure 3:
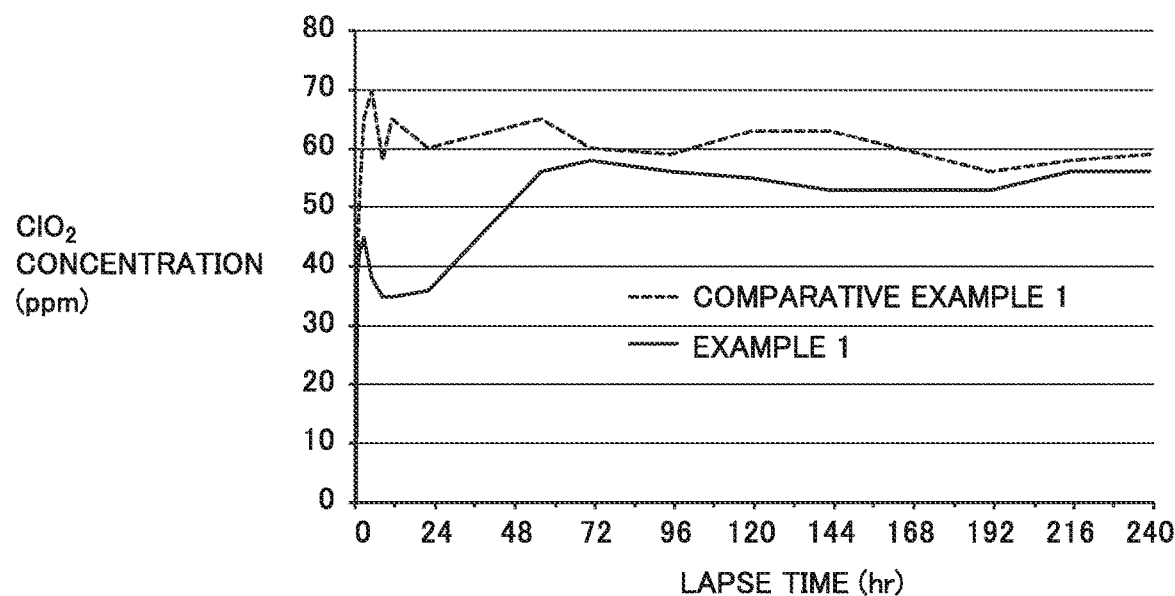
FIG. 3 is a graph showing a time-dependent change in the concentration of a chlorine dioxide gas generated by the lapse of 240 hours from the addition of a gelling activator to a chlorite aqueous solution in Comparative Example 1 and Example 1.

With reference to Table 1 and FIG. 3, in Comparative Example 1, the concentration of the chlorine dioxide initially generated by the lapse of 72 hours from the addition of the gelling activator for Comparative Example 1 to the chlorite aqueous solution (particularly by the lapse of 24 hours) was high, but in Example 1, the concentration of the chlorine dioxide initially generated by the lapse of 72 hours from the addition of the gelling activator for Example 1 to the chlorite aqueous solution (particularly by the lapse of 24 hours) was low. That is, in Example 1, by adding the gas generation controlling agent containing a carbonate and hydrogen peroxide in addition to the gas generation adjusting agent, the initial rapid generation of the chlorine dioxide gas after the addition of the gelling activator to the chlorite aqueous solution could be suppressed as compared with Comparative Example 1.

Figure 4:
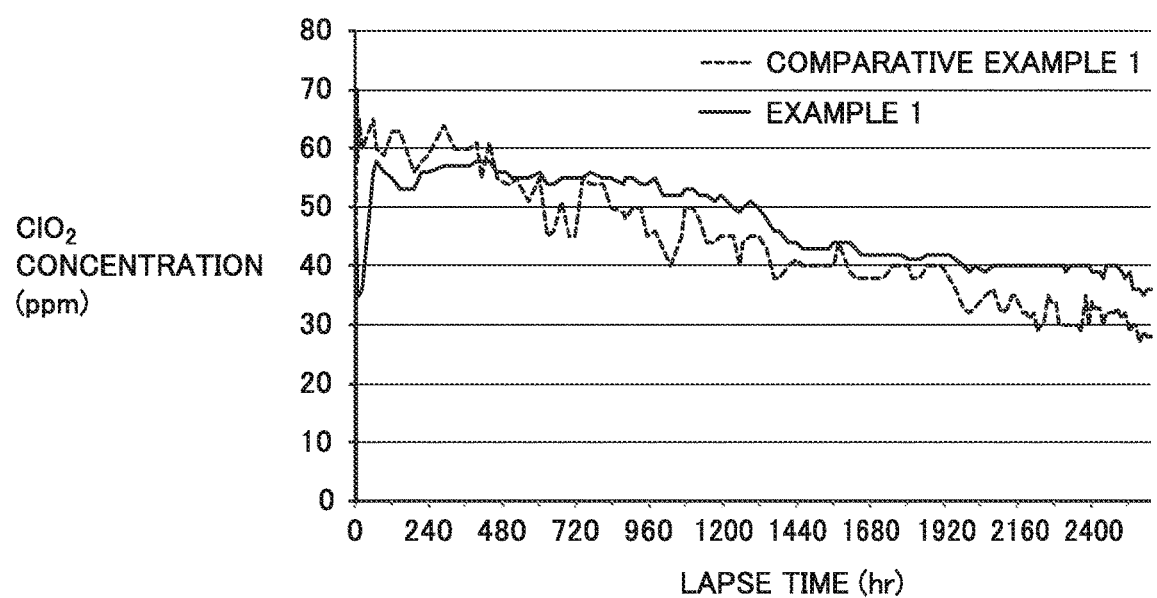
FIG. 4 is a graph showing a time-dependent change in the concentration of a chlorine dioxide gas generated by the lapse of 2,600 hours from the addition of a gelling activator to a chlorite aqueous solution in Comparative Example 1 and Example 1.

With reference to Tables 1 and 2 and FIG. 4, by the lapse of 2,600 hours from the addition of the gelling activator to the chlorite aqueous solution, the fluctuation of the concentration of the chlorine dioxide gas in Example 1 was smaller than that in Comparative Example 1. The maintenance period of the concentration of the chlorine dioxide gas of greater than or equal to about 40 ppm could be extended up to about 2,490 hours in Example 1, whereas the maintenance period of Comparative Example 1 was up to about 1,918 hours. That is, in Example 1, the chlorine dioxide gas could be continuously and stably generated for an extremely long time by adding the gas generation controlling agent containing a carbonate and hydrogen peroxide in addition to the gas generation adjusting agent. Therefore, according to Example 1, a method for generating a chlorine dioxide gas, a kit for generating a chlorine dioxide gas, and a gel composition were obtained, which could continuously and stably generate the chlorine dioxide gas for a long period of time of at least 2,160 hours (90 days).

Example 2

A gel composition was formed in the same manner as in Example 1 except that, to the 70.32 g of the chlorite aqueous solution (8.8% by mass sodium chlorite aqueous solution), 19.95 g of the gelling activator for examples (for the composition of each component, trisodium citrate dihydrate: 5.325 g, anhydrous citric acid: 2.925 g, polyacrylic acid-based water-absorbent resin: 8.4 g, sepiolite powder: 3 g, sodium carbonate hydrogen peroxide: 0.3 g) was added. A gel time was 3 minutes. A surface of the obtained gel composition was flat (visually flat with no local protrusion of the surface due to the addition of the gelling activator for examples to the chlorite aqueous solution). No cracks occurred in the surface of the gel composition.

Then, in the same manner as in Example 1, the concentration of the generated chlorine dioxide gas was measured after the lapse of a predetermined time from the addition of the gelling activator for examples to the chlorite aqueous solution, to examine its time-dependent change. The results were summarized in Tables 3 and 4 and FIGS. 5 and 6.

Comparative Example 2

A gel composition was formed in the same manner as in Example 2 except that, in place of 19.95 g of the gelling activator for examples, 19.65 g of the gelling activator for comparative examples (for the composition of each component, trisodium citrate dihydrate: 5.325 g, anhydrous citric acid: 2.925 g, polyacrylic acid-based water-absorbent resin: 8.4 g, sepiolite powder: 3 g) was used. A gel time was 3 minutes. In the surface of the obtained gel composition, local protrusion was formed by the addition of the gelling activator for comparative examples to a chlorite aqueous solution. Cracks occurred in the surface of the gel composition.

Then, in the same manner as in Example 1, the concentration of the generated chlorine dioxide gas was measured after the lapse of a predetermined time from the addition of the gelling activator for comparative examples to the chlorite aqueous solution, to examine its time-dependent change. The results were summarized in Tables 3 and 4 and FIGS. 5 and 6.

TABLE 3

| Lapse time (hr) | Temperature (° C.) | Humidity (%) | $ClO_2$ concentration (ppm) Comparative Example 2 | Example 2 |
|---|---|---|---|---|
| 0 | 20.3 | 69 | 0 | 0 |
| 0.5 | 20.3 | 69 | 44 | 42 |
| 1 | 20.3 | 69 | 52 | 38 |
| 2.5 | 20.6 | 74 | 64 | 46 |
| 5 | 20.1 | 70 | 60 | 41 |
| 8 | 20.2 | 69 | 58 | 39 |
| 11 | 20.6 | 69 | 58 | 39 |
| 22 | 20.4 | 77 | 56 | 41 |
| 56 | 20.7 | 76 | 54 | 55 |
| 71 | 20.0 | 70 | 58 | 56 |
| 95 | 20.0 | 75 | 53 | 54 |
| 119 | 20.2 | 77 | 50 | 52 |
| 143 | 20.4 | 78 | 56 | 53 |
| 191 | 20.4 | 71 | 50 | 54 |
| 215 | 20.4 | 70 | 55 | 55 |
| 239 | 20.2 | 70 | 55 | 55 |
| 287 | 20.0 | 79 | 56 | 55 |
| 324 | 20.1 | 71 | 58 | 56 |
| 348 | 20.2 | 78 | 56 | 55 |
| 372 | 19.8 | 70 | 54 | 54 |
| 396 | 19.8 | 86 | 55 | 55 |
| 414 | 19.9 | 74 | 55 | 56 |
| 438 | 19.9 | 80 | 55 | 56 |
| 462 | 20.0 | 77 | 49 | 54 |
| 491 | 20.2 | 80 | 50 | 52 |
| 509 | 20.0 | 82 | 52 | 53 |
| 524 | 20.0 | 83 | 51 | 53 |
| 564 | 20.1 | 84 | 50 | 52 |
| 600 | 20.1 | 84 | 50 | 52 |
| 624 | 20.1 | 87 | 46 | 50 |
| 648 | 19.8 | 86 | 43 | 50 |
| 672 | 20.2 | 88 | 48 | 51 |
| 696 | 20.2 | 84 | 42 | 50 |
| 720 | 20.0 | 84 | 41 | 50 |
| 744 | 19.9 | 82 | 45 | 50 |
| 768 | 20.1 | 84 | 50 | 51 |
| 804 | 20.3 | 84 | 50 | 51 |
| 812 | 19.9 | 84 | 50 | 50 |
| 836 | 20.2 | 84 | 50 | 50 |
| 875 | 19.9 | 85 | 48 | 50 |
| 883 | 20.1 | 84 | 45 | 50 |
| 907 | 20.0 | 84 | 45 | 50 |
| 931 | 20.2 | 81 | 45 | 49 |
| 955 | 20.1 | 84 | 40 | 50 |
| 981 | 20.2 | 87 | 45 | 49 |
| 1005 | 20.0 | 84 | 42 | 46 |
| 1029 | 20.1 | 84 | 42 | 46 |
| 1066 | 19.9 | 84 | 41 | 46 |
| 1077 | 20.1 | 84 | 42 | 46 |
| 1101 | 19.9 | 85 | 41 | 45 |
| 1125 | 20.0 | 74 | 44 | 46 |
| 1149 | 19.9 | 74 | 40 | 46 |
| 1173 | 19.9 | 70 | 40 | 46 |
| 1196 | 19.9 | 64 | 40 | 45 |
| 1233 | 19.9 | 61 | 36 | 44 |
| 1257 | 20.2 | 63 | 41 | 44 |
| 1268 | 19.9 | 63 | 36 | 43 |
| 1292 | 20.1 | 72 | 39 | 43 |
| 1317 | 19.9 | 79 | 38 | 43 |
| 1342 | 20.0 | 79 | 38 | 44 |
| 1366 | 19.9 | 80 | 34 | 39 |
| 1385 | 20.0 | 76 | 34 | 39 |
| 1414 | 19.8 | 72 | 34 | 42 |
| 1438 | 19.8 | 67 | 34 | 42 |
| 1462 | 19.9 | 62 | 34 | 42 |
| 1486 | 20.0 | 69 | 34 | 41 |

TABLE 4

| Lapse time (hr) | Temperature [° C.] | Humidity (%) | ClO₂ concentration (ppm) Comparative Example 2 | Example 2 |
|---|---|---|---|---|
| 1507 | 20.0 | 69 | 34 | 41 |
| 1547 | 19.8 | 58 | 34 | 40 |
| 1563 | 19.9 | 63 | 36 | 40 |
| 1579 | 19.9 | 69 | 36 | 40 |
| 1616 | 19.7 | 55 | 35 | 40 |
| 1635 | 19.9 | 56 | 35 | 37 |
| 1653 | 19.9 | 61 | 35 | 37 |
| 1677 | 19.9 | 60 | 35 | 37 |
| 1701 | 19.9 | 58 | 35 | 37 |
| 1725 | 19.9 | 57 | 34 | 37 |
| 1759 | 20.0 | 54 | 34 | 37 |
| 1783 | 20.0 | 57 | 34 | 36 |
| 1807 | 19.8 | 52 | 33 | 35 |
| 1819 | 19.8 | 50 | 28 | 35 |
| 1843 | 19.8 | 52 | 30 | 35 |
| 1867 | 19.7 | 50 | 30 | 37 |
| 1891 | 20.0 | 56 | 34 | 37 |
| 1918 | 20.0 | 55 | 34 | 37 |
| 1940 | 19.8 | 57 | 34 | 36 |
| 1962 | 19.9 | 63 | 34 | 36 |
| 1986 | 19.9 | 51 | 32 | 36 |
| 2010 | 19.9 | 42 | 30 | 34 |
| 2024 | 20.0 | 49 | 30 | 34 |
| 2057 | 20.0 | 40 | 30 | 34 |
| 2083 | 20.1 | 57 | 32 | 35 |
| 2107 | 19.9 | 65 | 30 | 35 |
| 2115 | 20.1 | 70 | 30 | 35 |
| 2131 | 19.9 | 65 | 30 | 35 |
| 2144 | 20.1 | 65 | 31 | 35 |
| 2155 | 19.9 | 65 | 30 | 35 |
| 2179 | 20.0 | 63 | 31 | 35 |
| 2191 | 20.0 | 65 | 30 | 35 |
| 2203 | 20.2 | 49 | 30 | 35 |
| 2216 | 20.0 | 50 | 31 | 35 |
| 2226 | 19.9 | 46 | 29 | 34 |
| 2239 | 19.9 | 48 | 30 | 34 |
| 2250 | 19.9 | 43 | 30 | 34 |
| 2264 | 20.1 | 50 | 32 | 35 |
| 2275 | 20.0 | 52 | 32 | 35 |
| 2288 | 20.1 | 55 | 31 | 35 |
| 2298 | 20.0 | 50 | 30 | 35 |
| 2312 | 20.0 | 45 | 30 | 35 |
| 2322 | 20.1 | 43 | 30 | 35 |
| 2336 | 20.0 | 43 | 29 | 35 |
| 2346 | 20.0 | 40 | 31 | 35 |
| 2360 | 20.0 | 45 | 31 | 35 |
| 2370 | 20.0 | 45 | 32 | 35 |
| 2384 | 20.1 | 51 | 32 | 35 |
| 2394 | 20.0 | 45 | 32 | 35 |
| 2408 | 20.0 | 45 | 31 | 35 |
| 2418 | 19.9 | 44 | 32 | 35 |
| 2431 | 19.9 | 46 | 31 | 35 |
| 2442 | 20.0 | 38 | 30 | 34 |
| 2455 | 20.0 | 50 | 30 | 35 |
| 2466 | 20.0 | 50 | 31 | 35 |
| 2479 | 20.0 | 50 | 31 | 35 |
| 2490 | 19.9 | 48 | 30 | 34 |
| 2503 | 20.0 | 42 | 30 | 34 |
| 2514 | 20.0 | 41 | 30 | 34 |
| 2527 | 20.0 | 40 | 29 | 33 |
| 2538 | 20.0 | 38 | 30 | 33 |
| 2551 | 20.0 | 41 | 30 | 33 |
| 2562 | 20.0 | 36 | 28 | 32 |
| 2575 | 20.0 | 40 | 29 | 32 |
| 2586 | 20.0 | 36 | 29 | 32 |
| 2599 | 19.9 | 37 | 29 | 32 |

Figure 5:
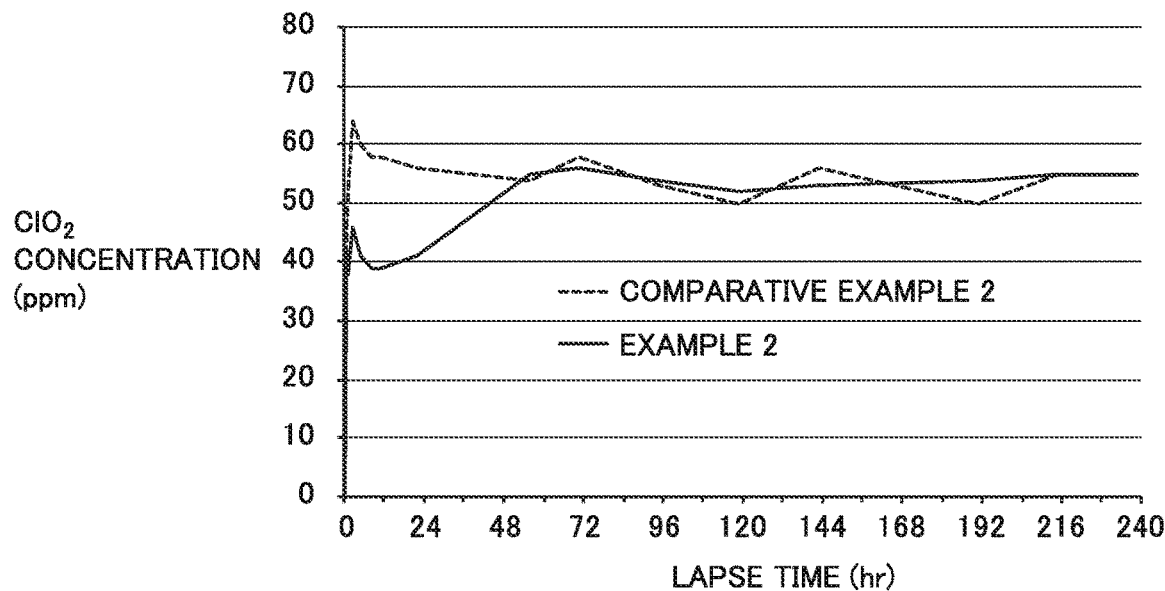
FIG. 5 is a graph showing a time-dependent change in the concentration of a chlorine dioxide gas generated by the lapse of 240 hours from the addition of a gelling activator to a chlorite aqueous solution in Comparative Example 2 and Example 2.

With reference to Table 3 and FIG. 5, in Comparative Example 2, the concentration of the chlorine dioxide initially generated by the lapse of 56 hours from the addition of the gelling activator for comparative examples to the chlorite aqueous solution (particularly by the lapse of 24 hours) was high, but in Example 2, the concentration of the chlorine dioxide initially generated by the lapse of 56 hours from the addition of the gelling activator for comparative examples to the chlorite aqueous solution (particularly by the lapse of 24 hours) was low. That is, in Example 2, by adding the gas generation controlling agent containing a carbonate and hydrogen peroxide in addition to the gas generation adjusting agent, the initial rapid generation of the chlorine dioxide gas after the addition of the gelling activator to the chlorite aqueous solution could be suppressed as compared with Comparative Example 2.

Figure 6:
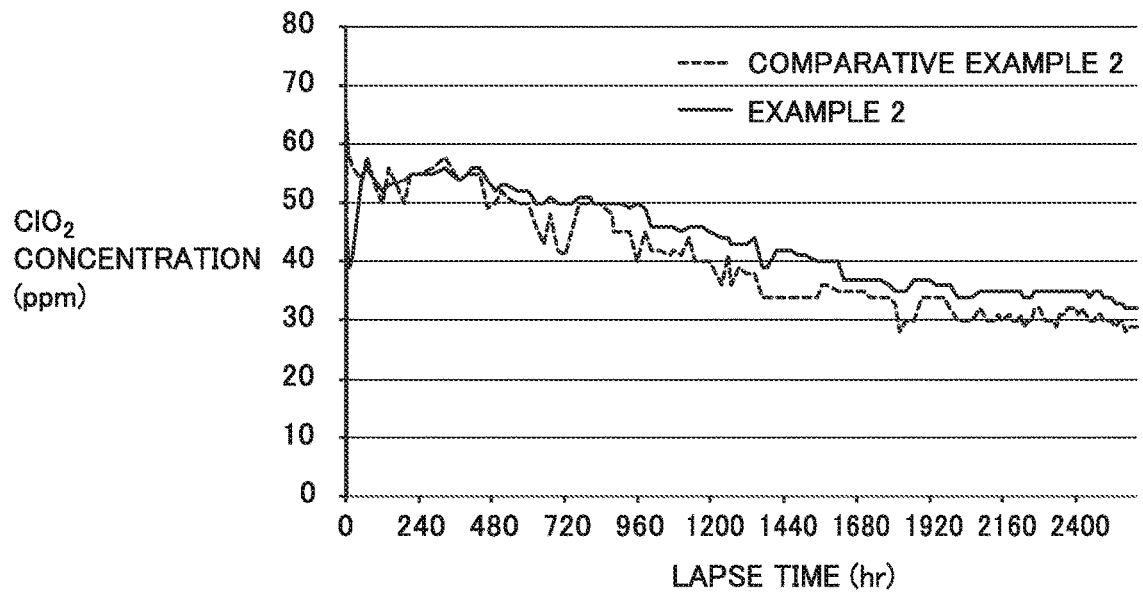
FIG. 6 is a graph showing a time-dependent change in the concentration of a chlorine dioxide gas generated by the lapse of 2,600 hours from the addition of a gelling activator to a chlorite aqueous solution in Comparative Example 2 and Example

With reference to Tables 3 and 4 and FIG. 6, by the lapse of 2,600 hours from the addition of the gelling activator to the chlorite aqueous solution, the fluctuation of the concentration of the chlorine dioxide gas in Example 2 was smaller than that in Comparative Example 2. The maintenance period of the concentration of the chlorine dioxide gas of greater than or equal to about 40 ppm could be extended up to about 1,616 hours in Example 2, whereas the maintenance period of Comparative Example 2 was up to about 1,257 hours. That is, in Example 2, the chlorine dioxide gas could be continuously and stably generated for an extremely long time by adding the gas generation controlling agent containing a carbonate and hydrogen peroxide in addition to the gas generation adjusting agent. Therefore, according to Example 2, a method for generating a chlorine dioxide gas, a kit for generating a chlorine dioxide gas, and a gel composition were obtained, which could continuously and stably generate the chlorine dioxide gas for a long period of time of at least 1,440 hours (60 days).

Example 3

A gel composition was formed in the same manner as in Example 1 except that, to 46.88 g of the chlorite aqueous solution (8.8% by mass sodium chlorite aqueous solution), 13.30 g of the gelling activator for examples (for the composition of each component, trisodium citrate dihydrate: 3.55 g, anhydrous citric acid: 1.95 g, polyacrylic acid-based water-absorbent resin: 5.6 g, sepiolite powder: 2 g, sodium carbonate hydrogen peroxide: 0.2 g) was added. A gel time was 2 minutes. A surface of the obtained gel composition was flat (visually flat with no local protrusion of the surface due to the addition of the gelling activator for examples to the chlorite aqueous solution). No cracks occurred in the surface of the gel composition.

Then, in the same manner as in Example 1, the concentration of the generated chlorine dioxide gas was measured after the lapse of a predetermined time from the addition of the gelling activator for examples to the chlorite aqueous solution, to examine its time-dependent change. The results were summarized in Tables 5 and 6 and FIGS. 7 and 8.

Comparative Example 3

A gel composition was formed in the same manner as in Example 2 except that, in place of 13.30 g of the gelling activator for examples, 13.10 g of the gelling activator for comparative examples (for the composition of each component, trisodium citrate dihydrate: 3.55 g, anhydrous citric acid: 1.95 g, polyacrylic acid-based water-absorbent resin: 5.6 g, sepiolite powder: 2 g) was used. A gel time was 2 minutes. In the surface of the obtained gel composition, local protrusion was formed by the addition of the gelling activator for comparative examples to a chlorite aqueous solution. Cracks occurred in the surface of the gel composition.

Then, in the same manner as in Example 1, the concentration of the generated chlorine dioxide gas was measured after the lapse of a predetermined time from the addition of the gelling activator for comparative examples to the chlorite aqueous solution, to examine its time-dependent change. The results were summarized in Tables 5 and 6 and FIGS. 7 and 8.

TABLE 5

| Lapse time (hr) | Temperature (° C.) | Humidity (%) | ClO₂ concentration (ppm) Comparative Example 3 | ClO₂ concentration (ppm) Example 3 |
|---|---|---|---|---|
| 0 | 20.3 | 69 | 0 | 0 |
| 0.5 | 20.3 | 69 | 45 | 44 |
| 1 | 20.3 | 69 | 43 | 43 |
| 2.5 | 20.6 | 74 | 60 | 41 |
| 5 | 20.1 | 70 | 59 | 35 |
| 8 | 20.2 | 69 | 58 | 36 |
| 11 | 20.6 | 69 | 56 | 36 |
| 22 | 20.4 | 77 | 54 | 37 |
| 56 | 20.7 | 76 | 50 | 50 |
| 71 | 20.0 | 70 | 50 | 49 |
| 95 | 20.0 | 75 | 50 | 50 |
| 119 | 20.2 | 77 | 50 | 50 |
| 143 | 20.4 | 78 | 50 | 50 |
| 191 | 20.4 | 71 | 50 | 50 |
| 215 | 20.4 | 70 | 50 | 51 |
| 239 | 20.2 | 70 | 55 | 50 |
| 287 | 20.0 | 79 | 52 | 51 |
| 324 | 20.1 | 71 | 53 | 50 |
| 348 | 20.2 | 78 | 54 | 50 |
| 372 | 19.8 | 70 | 45 | 45 |
| 396 | 19.8 | 86 | 50 | 45 |
| 414 | 19.9 | 74 | 45 | 45 |
| 438 | 19.9 | 80 | 45 | 45 |
| 462 | 20.0 | 77 | 41 | 45 |
| 491 | 20.2 | 80 | 45 | 43 |
| 509 | 20.0 | 82 | 40 | 43 |
| 524 | 20.0 | 83 | 43 | 44 |
| 564 | 20.1 | 84 | 45 | 45 |
| 600 | 20.1 | 84 | 44 | 44 |
| 624 | 20.1 | 87 | 38 | 44 |
| 648 | 19.8 | 86 | 33 | 44 |
| 672 | 20.2 | 88 | 40 | 44 |
| 696 | 20.2 | 84 | 36 | 44 |
| 720 | 20.0 | 84 | 38 | 45 |
| 744 | 19.9 | 82 | 40 | 45 |
| 768 | 20.1 | 84 | 40 | 44 |
| 804 | 20.3 | 84 | 40 | 44 |
| 812 | 19.9 | 84 | 41 | 45 |
| 836 | 20.2 | 84 | 40 | 45 |
| 875 | 19.9 | 85 | 34 | 44 |
| 883 | 20.1 | 84 | 35 | 42 |
| 907 | 20.0 | 84 | 33 | 40 |
| 931 | 20.2 | 81 | 34 | 41 |
| 955 | 20.1 | 84 | 35 | 41 |
| 981 | 20.2 | 87 | 32 | 41 |
| 1005 | 20.0 | 84 | 28 | 41 |
| 1029 | 20.1 | 84 | 34 | 42 |
| 1066 | 19.9 | 84 | 34 | 40 |
| 1077 | 20.1 | 84 | 35 | 40 |
| 1101 | 19.9 | 85 | 32 | 40 |
| 1125 | 20.0 | 74 | 35 | 41 |
| 1149 | 19.9 | 74 | 32 | 40 |
| 1173 | 19.9 | 70 | 30 | 36 |
| 1196 | 19.9 | 64 | 32 | 37 |
| 1233 | 19.9 | 61 | 32 | 38 |
| 1257 | 20.2 | 63 | 33 | 37 |
| 1268 | 19.9 | 63 | 30 | 36 |
| 1292 | 20.1 | 72 | 35 | 36 |
| 1317 | 19.9 | 79 | 23 | 36 |
| 1342 | 20.0 | 79 | 23 | 35 |
| 1366 | 19.9 | 80 | 23 | 34 |
| 1385 | 20.0 | 76 | 23 | 34 |
| 1414 | 19.8 | 72 | 26 | 34 |
| 1438 | 19.8 | 67 | 27 | 35 |
| 1462 | 19.9 | 62 | 26 | 35 |
| 1486 | 20.0 | 69 | 26 | 36 |

TABLE 6

| Lapse time (hr) | Temperature (° C.) | Humidity (%) | ClO₂ concentration (ppm) Comparative Example 3 | ClO₂ concentration (ppm) Example 3 |
|---|---|---|---|---|
| 1507 | 20.0 | 69 | 26 | 35 |
| 1547 | 19.8 | 58 | 26 | 34 |
| 1563 | 19.9 | 63 | 28 | 32 |
| 1579 | 19.9 | 69 | 30 | 35 |
| 1616 | 19.7 | 55 | 30 | 34 |
| 1635 | 19.9 | 56 | 30 | 34 |
| 1653 | 19.9 | 61 | 30 | 34 |
| 1677 | 19.9 | 60 | 30 | 34 |
| 1701 | 19.9 | 58 | 30 | 33 |
| 1725 | 19.9 | 57 | 30 | 33 |
| 1759 | 20.0 | 54 | 30 | 33 |
| 1783 | 20.0 | 57 | 30 | 31 |
| 1807 | 19.8 | 52 | 30 | 30 |
| 1819 | 19.8 | 50 | 26 | 30 |
| 1843 | 19.8 | 52 | 26 | 30 |
| 1867 | 19.7 | 50 | 26 | 30 |
| 1891 | 20.0 | 56 | 30 | 32 |
| 1918 | 20.0 | 55 | 30 | 32 |
| 1940 | 19.8 | 57 | 30 | 32 |
| 1962 | 19.9 | 63 | 30 | 31 |
| 1986 | 19.9 | 51 | 26 | 28 |
| 2010 | 19.9 | 42 | 24 | 28 |
| 2024 | 20.0 | 49 | 26 | 28 |
| 2057 | 20.0 | 40 | 24 | 28 |
| 2083 | 20.1 | 57 | 25 | 30 |
| 2107 | 19.9 | 65 | 25 | 30 |
| 2115 | 20.1 | 70 | 25 | 30 |
| 2131 | 19.9 | 65 | 25 | 30 |
| 2144 | 20.1 | 65 | 25 | 29 |
| 2155 | 19.9 | 65 | 25 | 29 |
| 2179 | 20.0 | 63 | 24 | 28 |
| 2191 | 20.0 | 65 | 24 | 28 |
| 2203 | 20.2 | 49 | 25 | 30 |
| 2216 | 20.0 | 50 | 26 | 29 |
| 2226 | 19.9 | 46 | 25 | 29 |
| 2239 | 19.9 | 48 | 25 | 29 |
| 2250 | 19.9 | 43 | 25 | 29 |
| 2264 | 20.1 | 50 | 25 | 29 |
| 2275 | 20.0 | 52 | 26 | 30 |
| 2288 | 20.1 | 55 | 26 | 30 |
| 2298 | 20.0 | 50 | 25 | 28 |
| 2312 | 20.0 | 45 | 25 | 28 |
| 2322 | 20.1 | 43 | 26 | 29 |
| 2336 | 20.0 | 43 | 25 | 29 |
| 2346 | 20.0 | 40 | 26 | 29 |
| 2360 | 20.0 | 45 | 26 | 29 |
| 2370 | 20.0 | 45 | 26 | 29 |
| 2384 | 20.1 | 51 | 28 | 29 |
| 2394 | 20.0 | 45 | 26 | 27 |
| 2408 | 20.0 | 45 | 26 | 27 |
| 2418 | 19.9 | 44 | 26 | 27 |
| 2431 | 19.9 | 46 | 26 | 27 |
| 2442 | 20.0 | 38 | 25 | 27 |
| 2455 | 20.0 | 50 | 26 | 27 |
| 2466 | 20.0 | 50 | — | — |
| 2479 | 20.0 | 50 | 26 | 27 |
| 2490 | 19.9 | 48 | — | — |
| 2503 | 20.0 | 42 | 24 | 27 |
| 2514 | 20.0 | 41 | — | — |
| 2527 | 20.0 | 40 | — | — |
| 2538 | 20.0 | 38 | — | — |
| 2551 | 20.0 | 41 | — | — |
| 2562 | 20.0 | 36 | 22 | 25 |
| 2575 | 20.0 | 40 | — | — |
| 2586 | 20.0 | 36 | 23 | 25 |
| 2599 | 19.9 | 37 | — | — |

Figure 7:
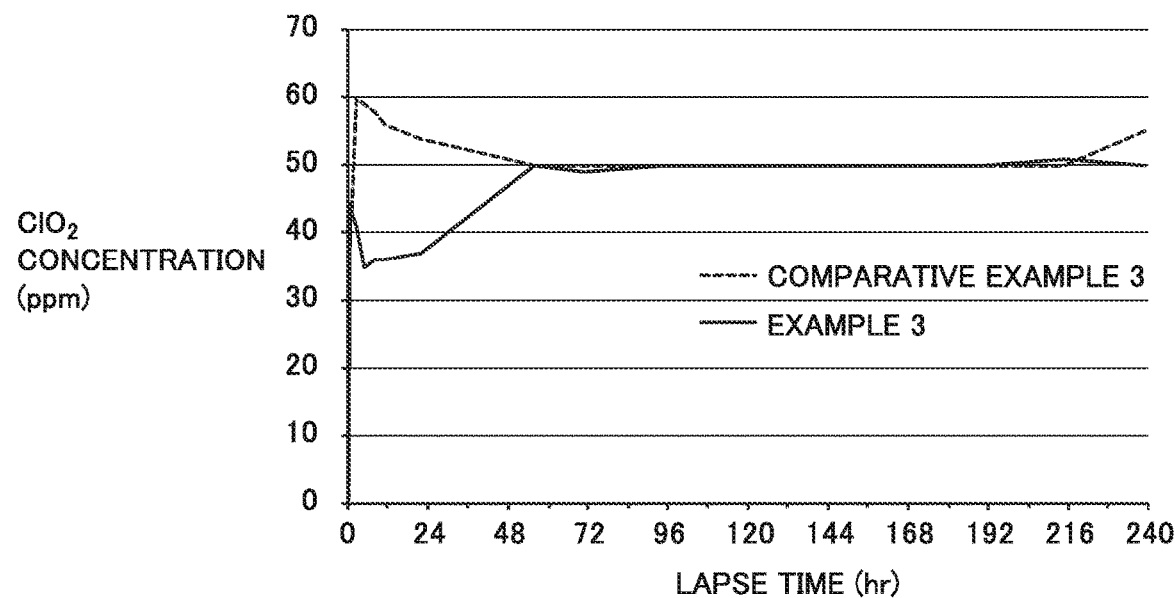
FIG. 7 is a graph showing a time-dependent change in the concentration of a chlorine dioxide gas generated by the lapse of 240 hours from the addition of a gelling activator to a chlorite aqueous solution in Comparative Example 3 and Example 3.

With reference to Table 5 and FIG. 7, in Comparative Example 3, the concentration of the chlorine dioxide initially generated by the lapse of 56 hours from the addition of the gelling activator for comparative examples to the chlorite aqueous solution (particularly by the lapse of 24 hours) was high, but in Example 3, the concentration of the chlorine dioxide initially generated by the lapse of 56 hours from the addition of the gelling activator for comparative examples to the chlorite aqueous solution (particularly by the lapse of 24 hours) was low. That is, in Example 3, by adding the gas generation controlling agent containing a carbonate and hydrogen peroxide in addition to the gas generation adjusting agent, the initial rapid generation of the chlorine dioxide gas after the addition of the gelling activator to the chlorite aqueous solution could be suppressed as compared with Comparative Example 3.

Figure 8:
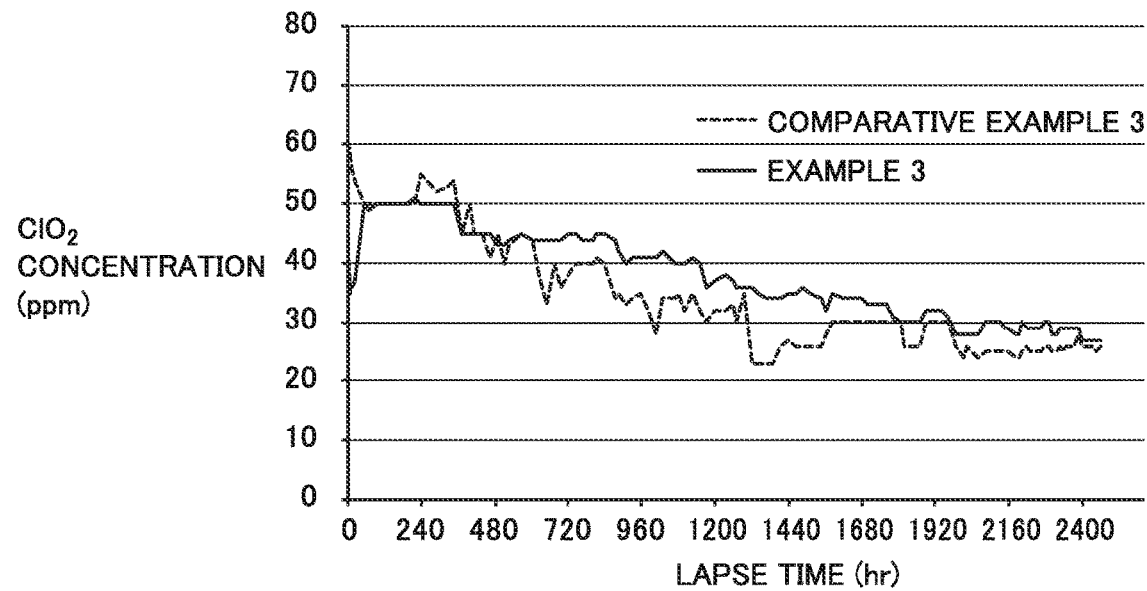
FIG. 8 is a graph showing a time-dependent change in the concentration of a chlorine dioxide gas generated by the lapse of 2,600 hours from the addition of a gelling activator to a chlorite aqueous solution in Comparative Example 3 and Example 3.

With reference to Tables 5 and 6 and FIG. 8, by the lapse of 2,600 hours from the addition of the gelling activator to the chlorite aqueous solution, the fluctuation of the concentration of the chlorine dioxide gas in Example 3 was smaller than that in Comparative Example 3. The maintenance period of the concentration of the chlorine dioxide gas of greater than or equal to about 40 ppm could be extended up to about 1,149 hours in Example 3, whereas the maintenance period of Comparative Example 3 was up to about 836 hours. That is, in Example 3, the chlorine dioxide gas could be continuously and stably generated for an extremely long time by adding the gas generation controlling agent containing a carbonate and hydrogen peroxide in addition to the gas generation adjusting agent. Therefore, according to Example 3, a method for generating a chlorine dioxide gas, a kit for generating a chlorine dioxide gas, and a gel composition were obtained, which could continuously and stably generate the chlorine dioxide gas for a long period of time of at least 1,080 hours (45 days).

Example 4

A gel composition was formed in the same manner as in Example 1 except that 117.25 g of a 9.0% by mass sodium chlorite aqueous solution was used as a chlorite aqueous solution, and 33.55 g of a mixed powder containing 8.125 g of trisodium citrate dehydrate, 4.875 g of anhydrous citric acid, 14.5 g of a polyacrylic acid water-absorbent resin, 5.25 g of a sepiolite powder, and 0.8 g of sodium carbonate hydrogen peroxide was used as a gelling activator for examples. A gel time was 4 minutes. A surface of the obtained gel composition was flat (visually flat with no local protrusion of the surface due to the addition of the gelling activator for examples to the chlorite aqueous solution). No cracks occurred in the surface of the gel composition.

Then, in the same manner as in Example 1, the concentration of the generated chlorine dioxide gas was measured after the lapse of a predetermined time from the addition of the gelling activator for examples to the chlorite aqueous solution, to examine its time-dependent change. The results were summarized in Table 7 and FIG. 9.

TABLE 7

| Lapse time (hr) | Temperature (° C.) | Humidity (%) | $ClO_2$ concentration (ppm) Example 4 |
|---|---|---|---|
| 0.5 | 20.1 | 69 | 35 |
| 2.0 | 20.1 | 71 | 35 |
| 19 | 20.0 | 80 | 25 |
| 30 | 20.0 | 79 | 25 |
| 52 | 20.2 | 79 | 40 |
| 68 | 20.0 | 80 | 50 |
| 91 | 20.0 | 86 | 48 |
| 163 | 20.0 | 86 | 46 |
| 209 | 20.2 | 75 | 44 |
| 281 | 20.2 | 79 | 45 |
| 377 | 20.2 | 74 | 45 |

TABLE 7-continued

| Lapse time (hr) | Temperature (° C.) | Humidity (%) | $ClO_2$ concentration (ppm) Example 4 |
|---|---|---|---|
| 497 | 20.3 | 78 | 47 |
| 569 | 20.3 | 78 | 49 |
| 631 | 20.1 | 75 | 51 |
| 679 | 20.1 | 75 | 50 |
| 751 | 20.2 | 77 | 44 |
| 823 | 20.2 | 74 | 35 |
| 943 | 20.2 | 72 | 43 |
| 1063 | 20.2 | 79 | 43 |
| 1135 | 20.2 | 80 | 40 |
| 1351 | 20.2 | 87 | 38 |
| 1495 | 20.0 | 84 | 38 |
| 1639 | 20.2 | 72 | 34 |
| 1855 | 20.0 | 84 | 33 |
| 2071 | 19.9 | 80 | 32 |
| 2263 | 20.2 | 79 | 32 |

Example 5

A gel composition was formed in the same manner as in Example 4 except that 33.35 g of a mixed powder containing 8.125 g of trisodium citrate dehydrate, 4.875 g of anhydrous citric acid, 14.5 g of a polyacrylic acid-based water-absorbent resin, 5.25 g of a sepiolite powder, and 0.6 g of sodium carbonate hydrogen peroxide was used as a gelling activator for examples. A gel time was 4 minutes. A surface of the obtained gel composition was flat (visually flat with no local protrusion of the surface due to the addition of the gelling activator for examples to the chlorite aqueous solution). No cracks occurred in the surface of the gel composition.

Then, in the same manner as in Example 1, the concentration of the generated chlorine dioxide gas was measured after the lapse of a predetermined time from the addition of the getting activator for examples to the chlorite aqueous solution, to examine its time-dependent change. The results were summarized in Table 8 and FIG. 10.

TABLE 8

| Lapse time (hr) | Temperature (° C.) | Humidity (%) | $ClO_2$ concentration (ppm) Example 5 |
|---|---|---|---|
| 0.5 | 20.6 | 84 | 39 |
| 2.0 | 20.6 | 77 | 40 |
| 22 | 20.0 | 86 | 35 |
| 35 | 20.2 | 84 | 51 |
| 45 | 20.0 | 86 | 50 |
| 69 | 20.0 | 84 | 50 |
| 117 | 20.0 | 86 | 52 |
| 163 | 19.8 | 87 | 50 |
| 235 | 20.2 | 79 | 48 |
| 307 | 20.2 | 79 | 48 |
| 427 | 20.2 | 74 | 48 |
| 523 | 20.3 | 78 | 49 |
| 643 | 20.3 | 78 | 50 |
| 691 | 20.1 | 75 | 48 |
| 739 | 20.0 | 75 | 44 |
| 835 | 20.2 | 75 | 43 |
| 979 | 20.2 | 79 | 44 |
| 1114 | 20.2 | 79 | 44 |
| 1282 | 20.2 | 86 | 43 |
| 1402 | 20.2 | 84 | 42 |
| 1618 | 20.2 | 87 | 40 |
| 1834 | 20.2 | 72 | 40 |
| 1978 | 20.0 | 80 | 42 |

TABLE 8-continued

| Lapse time (hr) | Temperature (° C.) | Humidity (%) | ClO₂ concentration (ppm) Example 5 |
|---|---|---|---|
| 2146 | 20.0 | 79 | 41 |
| 2338 | 19.9 | 55 | 39 |

Example 6

A gel composition was formed in the same manner as in Example 4 except that 33.05 g of a mixed powder containing 8.125 g of trisodium citrate dehydrate, 4.875 g of anhydrous citric acid, 14.5 g of a polyacrylic acid-based water-absorbent resin, 5.25 g of a sepiolite powder, and 0.3 g of sodium carbonate hydrogen peroxide was used as a gelling activator for examples. A gel time was 4 minutes. A surface of the obtained gel composition was flat (visually flat with no local protrusion of the surface due to the addition of the gelling activator for examples to the chlorite aqueous solution). No cracks occurred in the surface of the gel composition.

Then, in the same manner as in Example 1, the concentration of the generated chlorine dioxide gas was measured after the lapse of a predetermined time from the addition of the getting activator for examples to the chlorite aqueous solution, to examine its time-dependent change. The results were summarized in Table 9 and FIG. 11.

TABLE 9

| Lapse time (hr) | Temperature (° C.) | Humidity (%) | ClO₂ concentration (ppm) Example 6 |
|---|---|---|---|
| 0.5 | 20.6 | 84 | 42 |
| 2.0 | 20.6 | 77 | 52 |
| 22 | 20.0 | 86 | 53 |
| 35 | 20.2 | 84 | 55 |
| 45 | 20.0 | 86 | 55 |
| 69 | 20.0 | 84 | 55 |
| 117 | 20.0 | 86 | 54 |
| 163 | 19.8 | 87 | 51 |
| 235 | 20.2 | 79 | 50 |
| 307 | 20.2 | 79 | 48 |
| 427 | 20.2 | 74 | 48 |
| 523 | 20.3 | 78 | 50 |
| 643 | 20.3 | 78 | 50 |
| 691 | 20.1 | 75 | 52 |
| 739 | 20.0 | 75 | 45 |
| 835 | 20.2 | 75 | 43 |
| 979 | 20.2 | 79 | 45 |
| 1114 | 20.2 | 79 | 43 |
| 1282 | 20.2 | 86 | 44 |
| 1402 | 20.2 | 84 | 42 |
| 1618 | 20.2 | 87 | 40 |
| 1834 | 20.2 | 72 | 42 |
| 1978 | 20.0 | 80 | 42 |
| 2146 | 20.0 | 79 | 40 |
| 2338 | 19.9 | 55 | 38 |

Figure 9:
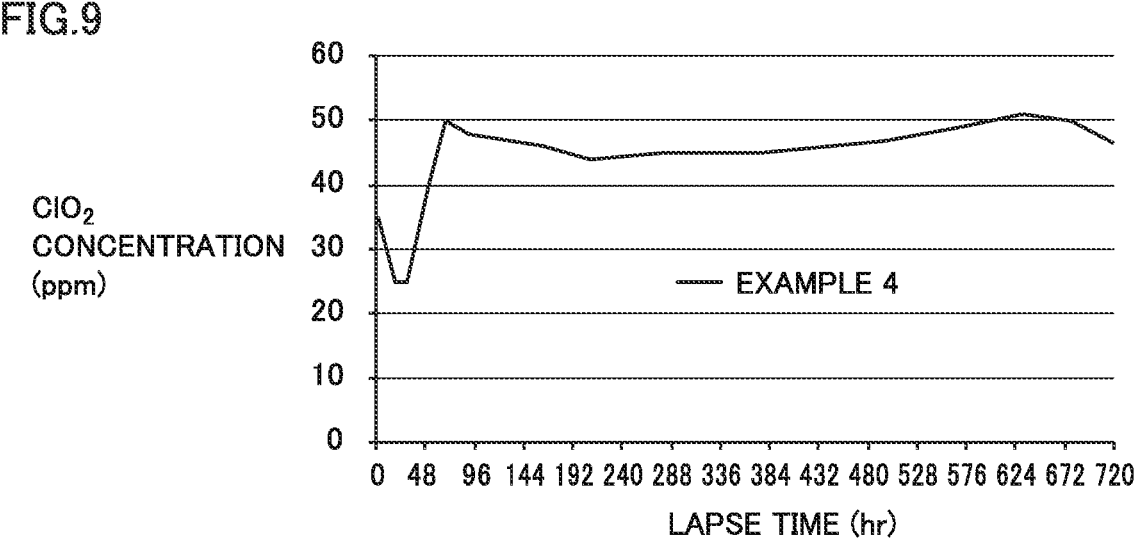
FIG. 9 is a graph showing a time-dependent change in the concentration of a chlorine dioxide gas generated by the lapse of 720 hours from the addition of a gelling activator to a chlorite aqueous solution in Example 4.
Figure 10:
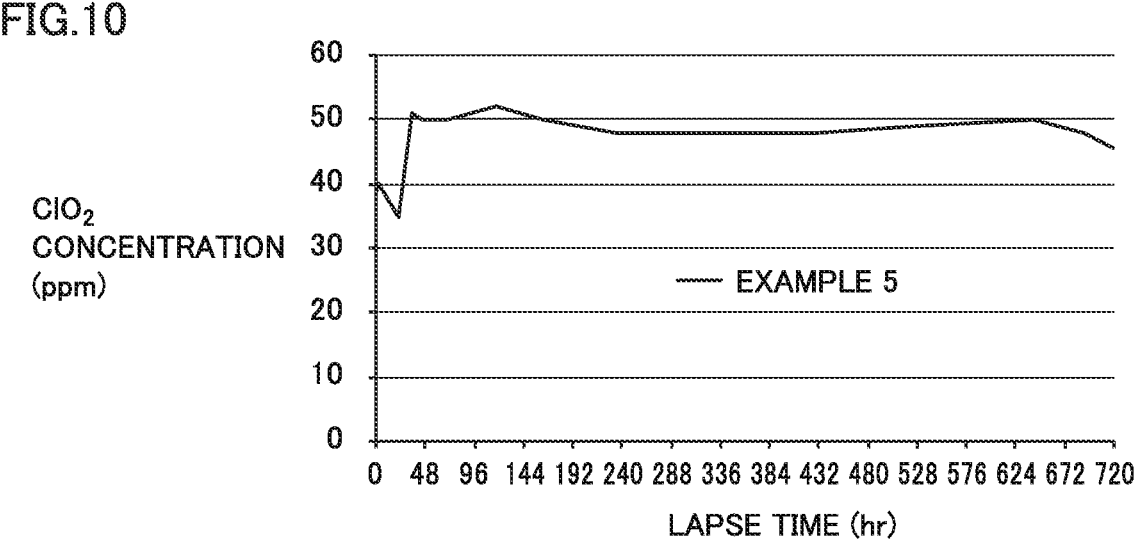
FIG. 10 is a graph showing a time-dependent change in the concentration of a chlorine dioxide gas generated by the lapse of 720 hours from the addition of a gelling activator to a chlorite aqueous solution in Example 5.
Figure 11:
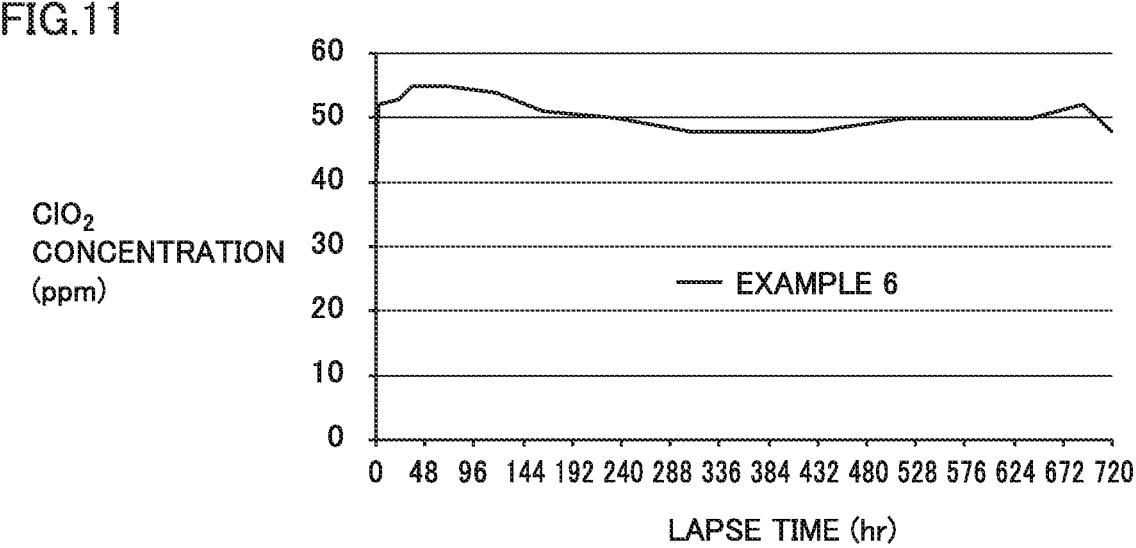
FIG. 11 is a graph showing a time-dependent change in the concentration of a chlorine dioxide gas generated by the lapse of 720 hours from the addition of a gelling activator to a chlorite aqueous solution in Example 6.

With reference to Tables 7 to 9 and FIGS. 9 to 11, in any of Examples 4 to 6, a method for generating a chlorine dioxide gas, a kit for generating a chlorine dioxide gas, and a gel composition were obtained, which suppressed the initial rapid generation of the chlorine dioxide gas by the lapse of 72 hours after the addition of the gelling activator for examples to the chlorite aqueous solution (particularly, the lapse of 24 hours) and could continuously and stably generate the chlorine dioxide gas for a long period of time of at least 720 hours (30 days).

It should be understood that the embodiment and examples disclosed herein are illustrative and non-restrictive in all respects. The scope of the present invention is defined by the claims, rather than the embodiments and examples above, and is intended to include any modifications within the meaning and scope equivalent to the claims.

REFERENCE SIGNS LIST

1: container for generating a chlorine dioxide gas, 1w, 10w, 22w, 24w: opening, 2: beaker, 3: plastic film, 4: Kitagawa type detecting tube, 10: plastic body, 20: plastic lid, 22: inner lid, 24: outer lid, 30: gel composition, 30s: surface

The invention claimed is:

1. A method for generating a chlorine dioxide gas, the method comprising continuously generating the chlorine dioxide gas from a gel composition obtained by adding a gelling activator containing a gas generating agent, a gas generation controlling agent containing an adduct of a carbonate and hydrogen peroxide, a gas generation adjusting agent being at least one selected from the group consisting of sepiolite, montmorillonite, diatomaceous earth, talc, and zeolite, and a water-absorbent resin to a chlorite aqueous solution, wherein
   amounts of the chlorite aqueous solution and the gelling activator are respectively 60% by mass to 90% by mass, and 10% by mass to 40% by mass based on the whole of the chlorite aqueous solution and the gelling activator,
   an amount of the gas generation controlling agent in the gelling activator is 1.5% by mass to 2.4 by mass based on the whole of the gelling activator,
   an amount of the gas generation controlling agent in the gelling activator is 3.6% by mass to 6.2% by mass based on the gas generating agent in the gelling activator,
   a maximum concentration of the chlorine dioxide generated at 0.5, 1, 2.5, 5, 8, 11, or 22 hours from adding the gelling activator to the chlorite aqueous solution is lower than a maximum concentration of the chlorine dioxide generated between 143 hours and 720 hours from adding the gelling activator to the chlorite aqueous solution, or
   a maximum concentration of the chlorine dioxide generated at 0.5, 2, or 19 hours from adding the gelling activator to the chlorite aqueous solution is lower than a maximum concentration of the chlorine dioxide generated between 163 hours and 679 hours from adding the gelling activator to the chlorite aqueous solution, and
   the gel composition has a flat surface from which the chlorine dioxide gas is generated.

2. The method according to claim 1, wherein a surface area of the flat surface is kept constant.

3. The method according to claim 1, wherein the chlorite aqueous solution is enclosed in an airtight container before the gelling activator is added.

4. The method according to claim 1, wherein the gelling activator is enclosed in an airtight container before being added to the chlorite aqueous solution.

5. A kit for generating a chlorine dioxide gas, the kit comprising:
   an agent (A) containing a chlorite aqueous solution; and
   an agent (B) containing a gelling activator containing a gas generating agent, a gas generation controlling agent containing an adduct of a carbonate and hydrogen peroxide, a gas generation adjusting agent being at least one selected from the group consisting of sepiolite, montmorillonite, diatomaceous earth, talc, and zeolite, and a water-absorbent resin, wherein the kit is configured to continuously generate the chlorine dioxide gas from a gel composition obtained by adding the agent (B) to the agent (A), amounts of the agents (A) and (B) are respectively 60% by mass to 90% by mass, and 10% by mass to 40% by mass based on the whole of the kit, an amount of the gas generation controlling agent in the gelling activator is 1.5% by mass to 2.4% by mass based on the whole of the agent (B), an amount of the gas generation controlling agent in the gelling activator is 3.6% by mass to 6.2% by mass based on the gas generating agent in the gelling activator, a maximum concentration of the chlorine dioxide generated at 0.5, 1, 2.5, 5, 8, 11, or 22 hours from adding the gelling activator to the chlorite aqueous solution is lower than a maximum concentration of the chlorine dioxide generated between 143 hours and 720 hours from adding the gelling activator to the chlorite aqueous solution, or a maximum concentration of the chlorine dioxide generated at 0.5, 2, or 19 hours from adding the gelling activator to the chlorite aqueous solution is lower than a maximum concentration of the chlorine dioxide generated between 163 hours and 679 hours from adding the gelling activator to the chlorite aqueous solution, and the gel composition has a flat surface from which the chlorine dioxide gas is generated.

6. A gel composition formed by addition of:

a chlorite aqueous solution; and a gelling activator containing a gas generating agent, a gas generation controlling agent containing an adduct of a carbonate and hydrogen peroxide, a gas generation adjusting agent being at least one selected from the group consisting of sepiolite, montmorillonite, diatomaceous earth, talc, and zeolite, and a water-absorbent resin, wherein the gel composition is configured to, upon addition of the gelling activator to the chlorite aqueous solution to form the gel composition, continuously generate a chlorine dioxide gas, an amount of the gas generation controlling agent is 0.33 by mass to 0.53% by mass based on the whole of the gel composition when the chlorite aqueous solution is added to the gelling activator, an amount of the gas generation controlling agent in the gelling activator is 3.6% by mass to 6.2% by mass based on the gas generating agent in the gelling activator, a maximum concentration of the chlorine dioxide generated at 0.5, 1, 2.5, 5, 8, 11, or 22 hours from adding the gelling activator to the chlorite aqueous solution is lower than a maximum concentration of the chlorine dioxide generated between 143 hours and 720 hours from adding the gelling activator to the chlorite aqueous solution, or a maximum concentration of the chlorine dioxide generated at 0.5, 2, or 19 hours from adding the gelling activator to the chlorite aqueous solution is lower than a maximum concentration of the chlorine dioxide generated between 163 hours and 679 hours from adding the gelling activator to the chlorite aqueous solution, and the gel composition has a flat surface from which the chlorine dioxide gas is generated.

7. The gel composition according to claim 6, wherein a surface area of the flat surface is kept constant.

8. The method according to claim 1, wherein the gas generating agent comprises anhydrous citric acid and trisodium citrate dihydrate.

9. The method according to claim 1, wherein the gas generation controlling agent comprises sodium carbonate hydrogen peroxide.

10. The method according to claim 1, wherein the gas generation adjusting agent comprises sepiolite.

11. The method according to claim 1, wherein the water-absorbent resin comprises polyacrylic acid-based water-absorbent resin.

* * * * *